(12) United States Patent
Kim et al.

(10) Patent No.: US 10,521,031 B2
(45) Date of Patent: Dec. 31, 2019

(54) ELECTRONIC DEVICE AND METHOD FOR PROCESSING INPUT BY EXTERNAL INPUT DEVICE

(71) Applicant: Samsung Electronics Co., Ltd., Suwon-si, Gyeonggi-do (KR)

(72) Inventors: Sungjun Kim, Daegu (KR); Jongwu Baek, Gumi-si (KR); Eunyeung Lee, Gumi-si (KR); Sangheon Kim, Gumi-si (KR); Youngdae Lee, Daegu (KR); Inhyung Jung, Gumi-si (KR); Hochang Chae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/996,186

(22) Filed: Jun. 1, 2018

(65) Prior Publication Data

US 2018/0348893 A1 Dec. 6, 2018

(30) Foreign Application Priority Data

Jun. 1, 2017 (KR) .......................... 10-2017-0068606

(51) Int. Cl.
*G06F 3/038* (2013.01)
*G06F 3/0354* (2013.01)
(Continued)

(52) U.S. Cl.
CPC .......... *G06F 3/038* (2013.01); *G06F 3/03545* (2013.01); *G06F 3/041* (2013.01);
(Continued)

(58) Field of Classification Search
CPC ...... G06F 3/03545; G06F 3/038; G06F 3/041; G06F 3/04883; G06F 3/147; G06F 2203/0382; G06F 2203/04101
See application file for complete search history.

(56) References Cited

U.S. PATENT DOCUMENTS 10,270,819 B2 * 4/2019 Conklin ................ G06F 3/1454
10,284,815 B2 * 5/2019 Nagpal ............... H04L 65/4015
(Continued)

FOREIGN PATENT DOCUMENTS

KR 10-2015-0090112 A 8/2015
KR 10-2016-0016278 A 2/2016

*Primary Examiner* — Nelson M Rosario

(57) ABSTRACT

An electronic device and a method are disclosed. The electronic device includes a housing, a display, a first communication circuit, a detection circuit, a memory, and a processor. The detection circuit is configured to detect a stylus pen when the stylus pen including a second communication circuit is located within a predetermined distance range from the display. The processor is operably connected to the display, the first communication circuit, the detection circuit, and the memory. The processor is configured to receive a signal containing unique identification information from the stylus pen. The processor is also configured to execute a first application program while receiving an input generated based on a touch by the stylus pen on the display or generated based on a movement of the stylus pen detected within the predetermined distance range. The processor is further configured to associate the unique identification information with the first application program.

18 Claims, 32 Drawing Sheets

(51) Int. Cl.
*G06F 3/041* (2006.01)
*G06F 3/147* (2006.01)
*G06F 3/0488* (2013.01)

(52) U.S. Cl.
CPC .......... *G06F 3/04883* (2013.01); *G06F 3/147* (2013.01); *G06F 2203/0382* (2013.01); *G06F 2203/04101* (2013.01)

(56) References Cited

U.S. PATENT DOCUMENTS

2006/0168531 A1 7/2006 Sato
2014/0149880 A1 5/2014 Farouki

\* cited by examiner

ELECTRONIC DEVICE AND METHOD FOR PROCESSING INPUT BY EXTERNAL INPUT DEVICE

CROSS-REFERENCE TO RELATED APPLICATIONS AND CLAIM OF PRIORITY

This application is based on and claims priority under 35 U.S.C. § 119 to Korean Patent Application No. 10-2017-0068606, filed on Jun. 1, 2017, in the Korean Intellectual Property Office, the disclosure of which is incorporated by reference herein in its entirety.

TECHNICAL FIELD

Various embodiments of the present disclosure relate to an electronic device and method for processing an input by an external input device.

BACKGROUND

With the recent growth of technology, various kinds of electronic devices such as a personal digital assistant (PDA), an electronic organizer, a smart phone, and a personal computer are being released.

In consideration of user's convenience, many recent electronic devices adopt a touch display (or referred to as a touch-sensitive display or a touch screen) capable of performing both an input function of receiving a touch input and an output function of displaying a screen. Further, as the size of a screen area increases and also the resolution of a display increases, user demands for handwriting input, picture memo, etc. using the touch display are also increasing.

The electronic device including the touch display may perform various functions in response to an input by an external input device such as a stylus pen as well as an input by a user's body (e.g., a hand), thus increasing the convenience and diversity of input actions on the touch display. However, in general, the electronic device merely performs a function in response to a touch or proximity input by the external input device, but fails to distinguish the external input devices from each other or manage distinctive information about the respective external input devices.

SUMMARY

Various embodiments of the present disclosure provide an electronic device and a method for processing an input by an external input device.

According to various embodiments of the present disclosure, an electronic device may comprise a housing; a display exposed through a portion of the housing; a first communication circuit disposed inside the housing; a detection circuit disposed inside the housing and detecting a stylus pen when the stylus pen including a second communication circuit is located within a predetermined distance range from the display; a processor disposed inside the housing and electrically connected to the display, the first communication circuit, and the detection circuit; and a memory disposed inside the housing and electrically connected to the processor. The memory may store instructions that cause, upon execution, the processor to receive a signal containing unique identification information from the stylus pen through the first communication circuit, to execute a first application program while receiving an input generated based on a touch by the stylus pen on the display or generated based on a movement of the stylus pen detected within the predetermined distance range, and to associate the unique identification information with the first application program.

According to various embodiments of the present disclosure, a method for processing an input by an external input device at an electronic device may comprise receiving a signal containing unique identification information from a stylus pen through a first communication circuit of the electronic device; executing, through a processor of the electronic device, a first application program while receiving an input generated based on a touch by the stylus pen on a display of the electronic device or generated based on a movement of the stylus pen detected within a predetermined distance range; and associating, through the processor, the unique identification information with the first application program.

According to various embodiments of the present disclosure, it is possible to manage various kinds of information related to unique identification information of an external input device through a short-range wireless communication function.

According to various embodiments of the present disclosure, it is possible to receive a signal including unique identification information from each of two or more external input devices through a short-range wireless communication function and thereby determine priorities of such external input devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
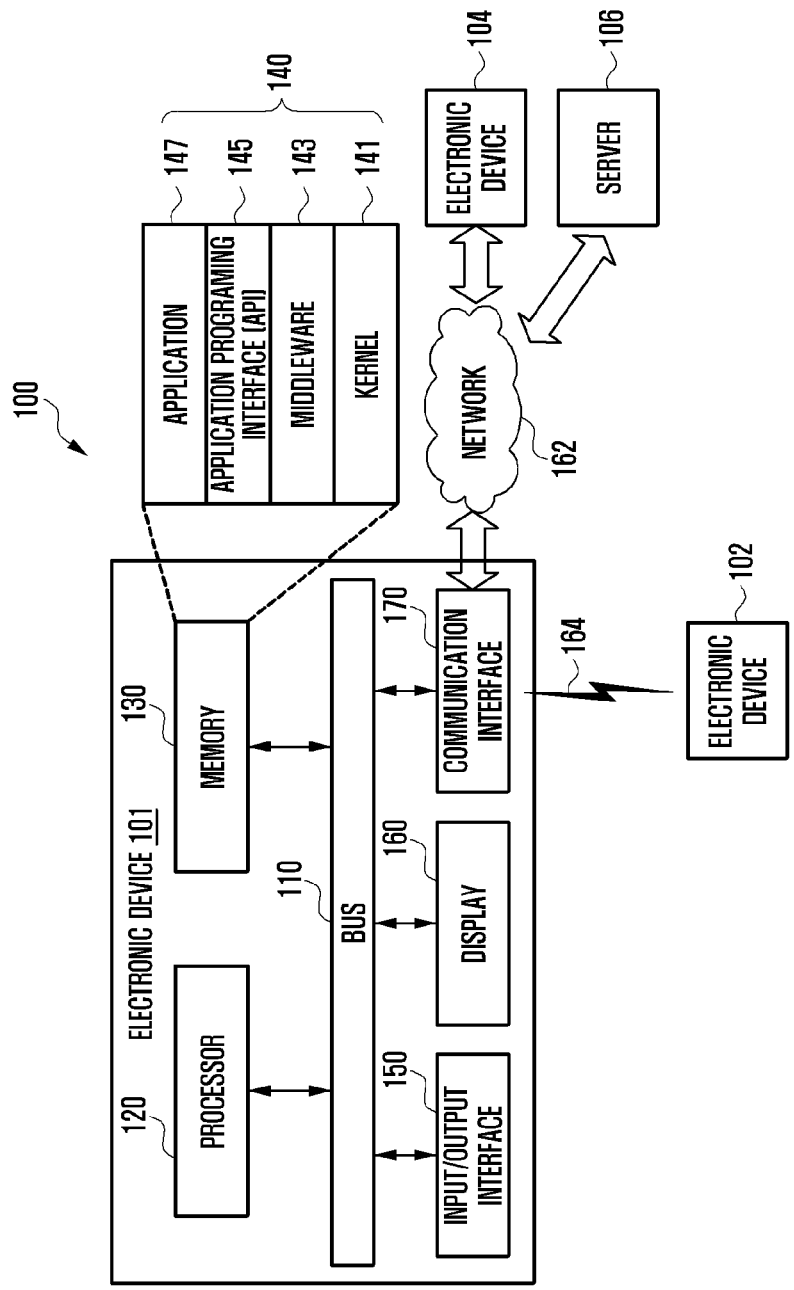
FIG. 1 illustrates a block diagram of a network environment including an electronic device according to various embodiments of the present disclosure.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are described with reference to the accompanying drawings. It should be understood that embodiments and terminology used therein are not intended to limit the disclosed technique to particular implementation, but various modifications, equivalents, and/or alternatives of the embodiments are included. In the description of the drawings, like reference numerals may be used for similar elements.

In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In this disclosure, the expressions "A or B", "at least one of A and/or B", and the like may include all possible combinations of items listed together. For example, "A or B", "at least one of A and B", or "at least one of A or B" may indicate all of (1) including at least one A, (2) including at least one B, and 3) including both of at least one A and at least one B.

The expressions including ordinal numbers, such as "first" and "second," may indicate various elements. The above expressions do not limit the sequence or importance of the elements, and are used merely for the purpose to distinguish one element from the others. For example, a first electronic device and a second electronic device may indicate different electronic devices regardless of the sequence or importance thereof. For example, without departing from the scope of the present disclosure, a first element may be referred to as a second element, and similarly a second element may be also referred to as a first element.

When a certain element (e.g., first element) is referred to as being "connected" or "coupled" (operatively or communicatively) to another element (e.g., second element), it may mean that the first element is connected or coupled directly to the second element or indirectly through any other element (e.g., third element). On the other hand, when a certain element (e.g., first element) is referred to as being "directly connected" or "directly coupled" to another element (e.g., second element), it may be understood that there is no element (e.g., third element) therebetween.

The expression "configured to" may be interchangeably used with any other expressions "suitable for", "having the ability to", "designed to", "adapted to", "made to", "being able to", and "capable of". The expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

Terms used herein may be merely to describe a certain embodiment, and may not be intended to limit the scope of other embodiments. The singular expressions may include plural expressions unless the context clearly dictates otherwise. Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a portable medical device, a digital camera, or a wearable device. According to various embodiments, the wearable device may include at least one of an accessory-type device (e.g., a watch, a ring, a bracelet, an anklet, a necklace, glasses, a contact lens, or a head-mounted device (HMD), a fabric- or cloth-type device (e.g., electronic cloth), a body-attached type device (e.g., a skin pad or tattoo), or a body-implemented type circuit. In some embodiments, the electronic device may be home appliance. For example, the home appliance may include at least one of a TV, a digital video disk (DVD) player, audio equipment, a refrigerator, an air conditioner, a vacuum cleaner, an oven, a microwave, a washing machine, an air cleaner, a set-top box, a home automation control panel, a security control panel, a media box (e.g., SAMSUN HOMESYNC, APPLE TV, or GOOGLE TV), a game console (e.g., XBOX, PLAYSTATION), an electronic dictionary, an electronic key, a camcorder, or an electronic picture frame.

In another embodiment, the electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MM), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, a drone, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.). In a certain embodiment, the electronic device may be include at least one of furniture, a part of a building/construction or car, an electronic board, an electronic signature receiving device, a projector, or various measuring instruments (e.g., a water meter, an electric meter, a gas meter, a wave meter, etc.). In various embodiments, the electronic device may be one of the above-mentioned devices or a combination thereof. The electronic device according to embodiments disclosed herein is not limited to the above-mentioned devices and may include new electronic devices to be launched with the growth of technology. In this disclosure, the term user may refer to a person or a device (e.g., an artificial intelligence device) using an electronic device.

Referring to FIG. 1, illustrated is an electronic device 101 in a network environment 100 according to various embodiments. The electronic device 101 may include a bus 110, a processor 120, a memory 130, an input/output (I/O) interface 150, a display 160, and a communication interface 170.

In a certain embodiment, the electronic device 101 may omit at least one of the above elements or further include any other element.

The bus 110 may be a circuit which interconnects the above elements 120 to 170 and delivers a communication (e.g., a control message and/or data) between the above elements.

The processor 120 may include at least one of a central processing unit (CPU), an application processor (AP), or a communication processor (CP). The processor 120 may execute an operation or data processing for control and/or communication of at least one of other elements.

The memory 130 may include volatile and/or non-volatile memory. The memory 130 may store instructions or data related to at least one element of the electronic device 101. According to an embodiment, the memory 130 may store software and/or programs 140.

The programs 140 may include, for example, a kernel 141, a middleware 143, an application programming interface (API) 145, and/or an application program (or application) 147. At least some of the kernel 141, the middleware 143, and the API 145 may be referred to as an operating system (OS).

The kernel 141 may control or manage system resources (e.g., the bus 110, the processor 120, the memory 130, etc.) used to execute operations or functions implemented in other programs (e.g., the middleware 143, the API 145, and the application program 147). Also, the kernel 141 may provide an interface capable of accessing individual elements of the electronic device 101 through the middleware 143, the API 145, or the application program 147, and thereby controlling or managing system resources.

The middleware 143 may perform a function of an intermediary so that the API 145 or the application program 147 communicates with the kernel 141 and thereby exchanges data. In addition, the middleware 143 may process one or more work requests, received from the application program 147, according to priorities. For example, the middleware 143 may assign, to the application program 147, a priority for using system resources (e.g., the bus 110, the processor 120, the memory 130, etc.) of the electronic device 101 and then process the one or more work requests.

The API 145 is an interface through which the application 147 controls a function provided by the kernel 141 or the middleware 143, and may include, for example, at least one interface or function (e.g., instructions) for file control, window control, image processing, character control, and/or the like.

The I/O interface 150 may transmit commands or data, inputted from a user or other external device, to other element(s) of the electronic device 101, or output commands or data, received from other element(s) of the electronic device 101, to a user or other external device.

The display 160 may include, for example, a liquid crystal display (LCD), a light-emitting diode (LED) display, an organic light-emitting diode (OLED) display, a micro-electro-mechanical systems (MEMS) display, or an electronic paper display. The display 160 may display, for example, various contents (e.g., text, image, video, icon, symbol, etc.) to a user. The display 160 may include a touch screen and may receive, for example, a touch, gesture, proximity, or hovering input using an electronic pen or a portion of the user's body.

The communication interface 170 may establish communication between the electronic device 101 and an external device (e.g., a first external electronic device 102, a second external electronic device 104, or a server 106). For example, the communication interface 170 may be connected to the network 162 via wireless or wired communication and communicate with an external device (e.g., the second external electronic device 104 or the server 106).

The wireless communication may include cellular communication using at least one of, for example, LTE, LTE Advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include at least one of, for example, wireless fidelity (WiFi), Bluetooth, Bluetooth low power (BLE), Zigbee, near field communication (NFC), magnetic secure transmission, radio frequency (RF), or body area network (BAN). According to an embodiment, the wireless communication may include GNSS. The GNSS may be, for example, global positioning system (GPS), global navigation satellite system (Glonass), Beidou navigation satellite system (Beidou), or Galileo, the European global satellite-based navigation system. Hereinafter, in this disclosure, "GPS" may be used interchangeably with "GNSS". The wired communications may include at least one of, for example, a universal serial bus (USB), a high definition multimedia interface (HDMI), a recommended standard 232 (RS-232), a power line communication, or a plain old telephone service (POTS). The network 162 may include a telecommunications network, for example, at least one of a computer network (e.g., LAN or WAN), the Internet, or a telephone network.

Each of the first and second external electronic devices 102 and 104 may be similar to or different from the electronic device 101 in types. According to various embodiments, all or part of operations performed in the electronic device 101 may be performed in another electronic device or multiple electronic devices (e.g., the electronic devices 102 and 104 and the server 106). According to an embodiment, in case of having to perform a certain function or service automatically or on demand, the electronic device 101 may request any other electronic device (e.g., the electronic device 102 or 104 or the server 106) to perform at least part of the function or service rather than or in addition to autonomously performing the function or service. Then, the other electronic device (e.g., the electronic device 102 or 104 or the server 106) may perform the requested function or service and return a result to the electronic device 101. The electronic device 101 may provide the requested function or service by using or further processing the received result. For this, cloud computing technique, distributed computing technique, or client-server computing technique may be utilized for example.

Figure 2:
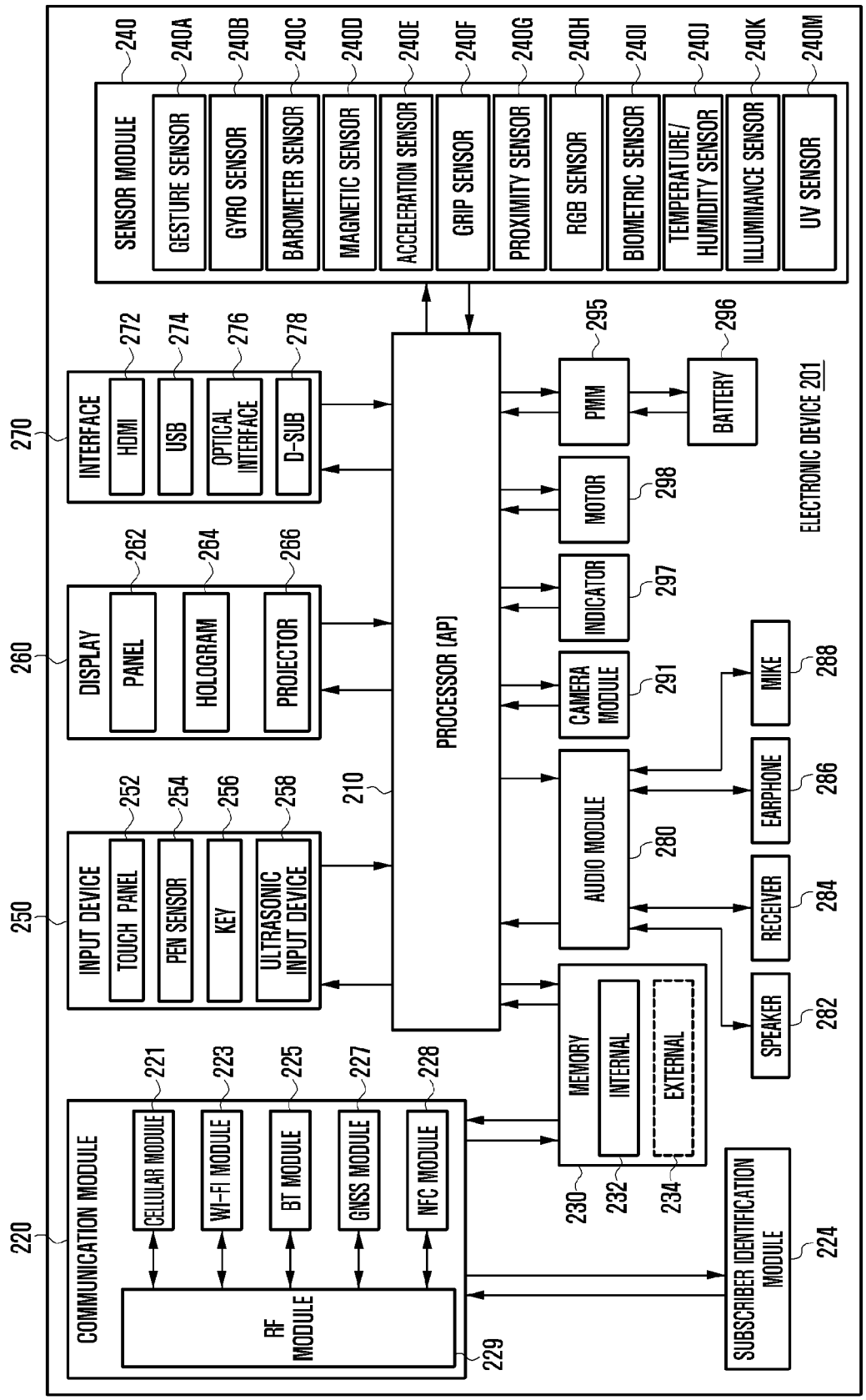
FIG. 2 illustrates a block diagram of an electronic device according to various embodiments of the present disclosure.

FIG. 2 illustrates a block diagram of an electronic device 201 according to embodiments of the present disclosure. The electronic device 201 may include, for example, the whole or part of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may execute an operating system (OS) or an application program, control multiple hardware or software components connected to the processor 210, and perform processing and operations on various data. The processor 210 may be implemented by, for example, a system on chip (SoC). According to an embodiment, the processor 210 may further include a graphic processing unit (GPU) and/or an image signal processor. The processor 210 may include at least some of elements shown in FIG. 2 (e.g., a cellular module 221). The processor 210 may load and process instructions or data received from at least one of the other elements (e.g., non-volatile memory) into volatile memory and then store the resulting data in non-volatile memory.

The communication module 220 may be, for example, the communication interface 170 shown in FIG. 1. The communication module 220 may include, for example, a cellular module 221, a Wi-Fi module 223, a Bluetooth (BT) module 225, a GNSS module 227, an NFC module 228, and a radio frequency (RF) module 229. The cellular module 221 may provide a voice call, a video call, a messaging service, or an Internet service, for example, through a communication network. According to an embodiment, the cellular module 221 may utilize the subscriber identity module (e.g., a SIM card) 224 to perform the identification and authentication of the electronic device 201 in the communication network. According to an embodiment, the cellular module 221 may perform at least some of functions that the processor 210 may provide. According to an embodiment, the cellular module 221 may include a communications processor (CP). Each of the WiFi module 223, the Bluetooth module 225, the GNSS module 227, and the NFC module 228 may include a processor for processing data transmitted or received therethrough. According to a certain embodiment, at least some (e.g., two or more) of the cellular module 221, the WiFi module 223, the Bluetooth module 225, the GNSS module 227, or the NFC module 228 may be included in an integrated chip (IC) or an IC package. The RF module 229 may, for example, transmit and receive communication signals (e.g., RF signals). The RF module 229 may include, for example, a transceiver, a power amplifier module (PAM), a frequency filter, a low noise amplifier (LNA), or an antenna. According to another embodiment, at least one of the cellular module 221, the WiFi module 223, the Bluetooth module 225, the GNSS module 227, or the NFC module 228 may transmit and receive RF signals through separate RF modules. The SIM 224 may include, for example, a card having SIM or an embedded SIM, and may include unique identification information (e.g., an integrated circuit card identifier (ICCID), or an international mobile subscriber identity (IMSI)).

The memory 230 (e.g., the memory 130 shown in FIG. 1) may include an internal memory 232 and an external memory 234. The internal memory 232 may include, for example, at least one of a volatile memory (e.g., a DRAM, an SRAM, or SDRAM), and a non-volatile memory (e.g., a one time programmable ROM (OTPROM), a PROM, an EPROM, an EEPROM, a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme Digital (xD), or a memory stick. The external memory 234 may be functionally or physically connected to the electronic device 201 through various interfaces.

The sensor module 240 may, for example, measure a physical quantity or detect an operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green and blue) sensor), a biometric sensor 240I, a temperature/humidity sensor 240J, an illuminance sensor 240K, or a ultra violet (UV) sensor 240M. Additionally or alternatively, the sensor module 240 may include, for example, an electromyography (EMG) sensor, an electroencephalogram (EEG) sensor, an electroardiogram (ECG) sensor, an infrared (IR) sensor, an iris sensor, and/or a fingerprint sensor. The sensor module 240 may further include a control circuit for controlling one or more sensors included therein. In a certain embodiment, the electronic device 201 further includes a processor configured to control the sensor module 240, either as part of the processor 210 or separately, to control the sensor module 240 while the processor 210 is in a sleep state.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user. The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 through an input tool that generates ultrasonic signals, thus allowing wireless recognition.

According to various embodiments of the present disclosure, the digital pen sensor 254 may refer to a digitizer panel capable of detecting a proximity input (e.g., a hovering input) of a user's touch electronic pen (e.g., a stylus pen). The digitizer panel may be implemented, for example, in an electro magnetic resonance (EMR) manner, and can detect the proximity input of the electronic pen on the basis of a change in strength of the magnetic field caused by proximity of the electronic pen. The digitizer panel may include, for example, an electromagnetic induction coil sensor (not shown) having a loop coil, and an electronic signal processor (not shown) for sequentially transmitting an AC signal of a certain frequency to each loop coil of the electromagnetic induction coil sensor. When the electronic pen having a resonance circuit approaches the loop coil in the digitizer panel, a magnetic field transmitted from the loop coil may generate an induced current based on mutual electromagnetic induction in the resonance circuit of the electronic pen. In this case, due to the current generated in the resonance circuit of the electronic pen, an induction magnetic field can be generated from the coil constituting the resonance circuit of the electronic pen. In addition, the digitizer panel can detect a change in strength of the magnetic field, based on the induction magnetic field generated from the electronic pen, and thereby determine the approach of the electronic pen and an approaching location (e.g., coordinates). The digitizer panel may be formed with a certain area, for example, an area corresponding to the display area of the panel 262, under the display 260.

The display 260 (e.g., the display 160) may include a panel 262, a hologram 264, a projector 266, and/or a control circuit for controlling them. The panel 262 may have a flexible, transparent or wearable form. The panel 262 may be formed of a single module with the touch panel 252. In a certain embodiment, the panel 262 may include a pressure sensor capable of measuring a pressure of a user's touch. The pressure sensor may be incorporated into the touch panel 252 or formed separately from the touch panel 252. The hologram 264 may show a stereoscopic image in the air using interference of light. The projector 266 may project an image onto a screen, which may be located at the inside or outside of the electronic device 201.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (MultiMedia Card) interface, or an IrDA (Infrared Data Association) interface.

The audio module 280 may perform a conversion between sounds and electric signals. At least parts of the audio module 280 may be included, for example, in the I/O interface 145 shown in FIG. 1. The audio module 280 may process sound information inputted or outputted through a speaker 282, a receiver 284, an earphone 286, or a microphone 288.

The camera module 291 is a device capable of acquiring still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown). The image sensor may include an integrated circuit photoelectric conversion device using a manufacturing technique of a semiconductor device.

The power management module 295 may manage electric power of the electronic device 201. Although not shown, the power management module 295 may include, for example, a PMIC (Power Management Integrated Circuit), a charger IC, or a battery or fuel gauge. The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
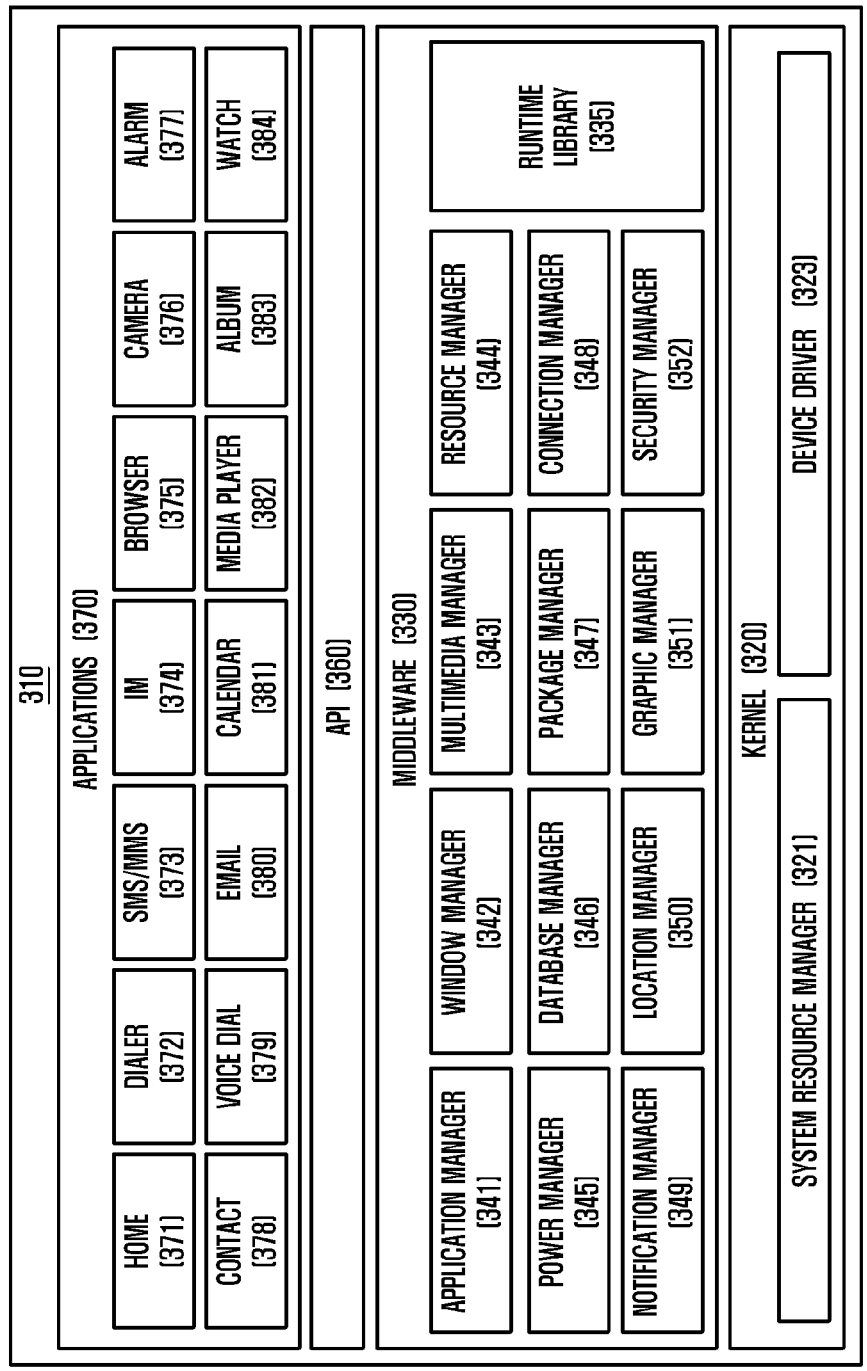
FIG. 3 illustrates a block diagram of a program module according to various embodiments of the present disclosure.

FIG. 3 illustrates a block diagram of a program module according to various embodiments of the present disclosure. According to one embodiment, the program module 310 (e.g., the program 140) may include an OS controlling resources related to an electronic device (e.g., the electronic device 101) and/or various applications (e.g., the application program 147) executed in the OS. For example, the OS may be ANDROID, IOS, WINDOWS, SYMBIAN, TIZEN, BADA, and the like.

The program module 310 may include a kernel 320 (e.g., the kernel 141), a middleware 330 (e.g., the middleware 143), an API 360 (e.g., the API 145), and/or the application 370 (e.g., the application program 147). At least a part of the program module 310 may be preloaded in the electronic device or downloaded from an external electronic device (e.g., the electronic device 102, 104 or the server 106).

The kernel 320 may include a system resource manager 321 and/or a device driver 323. The system resource manager 321 may perform the control, allocation, recovery, and/or the like of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like.

According to an embodiment, when the electronic device (e.g., the electronic device 101) has a telephone function, the middleware 330 may further include a telephony manager for managing a voice telephony call function and/or a video telephony call function of the electronic device. The middleware 330 may include a middleware module for forming various functional combinations of the above-described elements. The middleware 330 may provide modules specialized according to types of OSs in order to provide differentiated functions. Also, the middleware 330 may dynamically delete some of the existing elements, or may add new elements. The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, or at least one application capable of performing functions such as health care (e.g., measurement of exercise amount or blood glucose) or environmental information provision (e.g., providing information about air pressure, humidity, temperature, or the like).

According to one embodiment, the applications 370 may include an application (hereinafter, referred to as "information exchange application") that supports the exchange of information between the electronic device (e.g., 101) and an external electronic device (e.g., 102 or 104). The information exchange application may include, for example, a notification relay application for delivering specific information to the external electronic device, or a device management application for managing the external electronic device. For example, the notification relay application may have a function of sending notification information generated in other applications (e.g., the SMS/MMS application, the email application, the healthcare application, or the environmental information application) of the electronic device to the external electronic device (e.g., 102 or 104). Further, the notification relay application may receive notification information from the external electronic device and provide it to the user. The device management application may manage (e.g., install, delete, or update) at least one function (e.g., turn-on/turn-off of the external electronic device itself or some components thereof or adjusting the brightness or resolution of the display) of the external electronic device (e.g., 102 or 104), at least one application running in the external electronic device, or at least one service (e.g., a call service or a message service) provided in the external electronic device.

According to one embodiment, the applications 370 may include an application (e.g., a healthcare application of a mobile medical device, etc.) designated depending on the attributes of the external electronic device (e.g., 102 or 104). According to one embodiment, the applications 370 may include an application received from the external electronic device (e.g., the server 106 or the electronic device 102 or 104). According to one embodiment, the applications 370 may include a preloaded application or a third party application downloadable from a server. The names of elements of the program module 310 according to the illustrated embodiment may be varied depending on the type of the operating system. According to various embodiments, at least a part of the program module 310 may be implemented in software, firmware, hardware, or a combination thereof. At least a part of the program module 310 may be implemented (e.g., executed) by, for example, a processor (e.g., 210). At least a part of the program module 310 may include, for example, modules, programs, routines, sets of instructions, or processes to perform one or more functions.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions. According to various embodiments, at least a part of the device (e.g., modules or functions thereof) or the method (e.g., operations) may be implemented, for example, as instructions stored in a non-transitory computer-readable storage medium in a programming module form. When the instructions are executed by a processor (e.g., the processor 120), the processor may execute a function corresponding to the instructions. The computer-readable storage medium may be, for example, the memory 130.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa. A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

Figure 4:
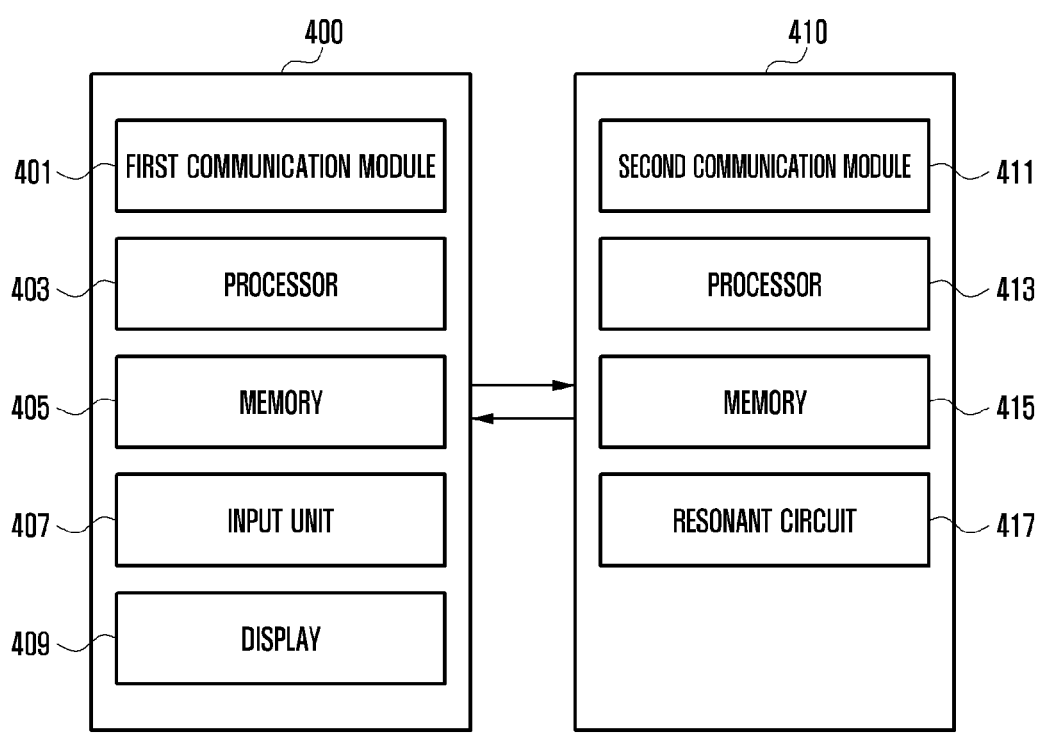
FIG. 4 illustrates a block diagram of an input processing system according to various embodiments of the present disclosure.

FIG. 4 illustrates a block diagram of an input processing system according to various embodiments of the present disclosure.

According to various embodiments, the input processing system may include an electronic device 400 and a first external input device 410. According to various embodiments, the electronic device 400 may include all or part of the electronic device 201 shown in FIG. 2. According to various embodiments, the first external input device 410 may include all or part of the electronic device 201 shown in FIG. 2, and may refer to any separate device that can be used for entering information into the electronic device 400. Although an electronic pen such as a stylus pen is described as an example in this embodiment, the present disclosure is not limited to this embodiment.

According to various embodiments, the electronic device 400 may include a first communication module 401 (e.g., the communication module 220), a processor 403 (e.g., the application processor 210), a memory 405 (e.g., the memory 230), an input unit 407 (e.g., the input device 250), and a display 409 (e.g., the display 260). The processor 403 may control respective elements of the electronic device 400. The input unit 407 and the display 409 may be formed of an integrated single module or separately formed of two or more individual modules. The first communication module 401 may include a hardware component, for example, a communication circuit. In this disclosure, terms a communication module and a communication circuit may be used interchangeably.

According to various embodiments, the first external input device 410 may include a second communication module 411 (e.g., the communication module 220), a processor 413 (e.g., the application processor 210), a memory 415 (e.g., the memory 230), and resonant circuit 417. The processor 413 may control respective elements of the first external input device 410. According to various embodiments, the first external input device 410 may further include a physical button (not shown) that can change the frequency of an AC signal flowing in a loop coil contained in the resonant circuit 417.

According to various embodiments, the first external input device 410 may transmit a signal (hereinafter, referred to as an ID signal) containing its own unique identification (ID) to the electronic device 400 through the second communication module 411, and the electronic device 400 may receive the ID signal from the first external input device 410 through the first communication module 401. For example, the first external input device 410 may periodically transmit the ID signal through the second communication module 411 by using a beacon technique based on Bluetooth low energy. Using the first communication module 401, the electronic device 400 may search for the ID signal transmitted by the first external input device 410 and receive a found signal. Although the Bluetooth low energy based technique is described in this embodiment, this is exemplary only and not to be construed as a limitation. The ID signal may include Bluetooth address information, WiFi media access control (MAC) address, or any other address information used for wireless communication connection.

According to various embodiments, the electronic device 400 may detect the strength of the ID signal received via the first communication module 401. For example, the electronic device 400 may detect the strength of the ID signal by computing a received signal strength indication (RSSI) of the ID signal. According to various embodiments, based on the detected strength of the ID signal, the electronic device 400 may determine a distance between the electronic device 400 and the first external input device 410. According to various embodiments, based on a variation in the strength of the ID signals periodically received from the first external input device 410, the electronic device 400 may determine whether the first external input device 410 is approaching.

According to various embodiments, the electronic device 400 may detect a touch input and/or proximity input of the first external input device 410 via the input unit 407. For example, through a touch panel included in the input unit 407, the electronic device 400 may detect a touch input by the first external input device 410, based on a variation of physical quantity (e.g., capacitance) caused by the first external input device 410, and also determine the coordinates corresponding to the touch input. In this case, the first external input device 410 may have an electrode at a pen tip to be in contact with the touch panel of the electronic device 400. In addition, through a digitizer panel included in the input unit 407, the electronic device 400 may detect a proximity input by the first external input device 410, based on a variation of physical quantity (e.g., strength of magnetic field) caused by the resonant circuit 417 included in the first external input device 410, and also determine the coordinates corresponding to the proximity input.

According to various embodiments, based on the strength of an ID signal received through the first communication module 401 and also based on a touch input and/or a proximity input of the first external input device 410 detected through the input unit 407, the electronic device 400 may match the ID of the first external input device 410 to the touch input and/or proximity input detected through the input unit 407. For example, if a touch input and/or a proximity input is detected through the input unit 407 when it is determined that the first external input device 410 is approaching based on a variation in strength of ID signals periodically received from the first external input device 410, the electronic device 400 may determine that the touch input and/or proximity input detected through the input unit 407 are/is caused by the first external input device 410. At this time, when there are two or more external input devices determined to approach the electronic device 400, the electronic device 400 may compare the strengths of signals received from the two or more external input devices and then respectively match the IDs of the two or more external input devices to the touch inputs and/or proximity inputs detected through the input unit 407.

In addition, the electronic device 400 may periodically and temporarily store information about the coordinates of the touch input and/or proximity input detected through the input unit 407 in the memory 405 to track the touch input and/or proximity input by the first external electronic input device 410. Through this, it is possible to reduce a processing time for the touch input and/or proximity input while the touch input and/or proximity input are/is continuously received. Also, while tracking the touch input and/or proximity input by the first external input device 410, the electronic device 400 may temporarily stop operations (e.g., signal strength detection) related to processing the ID signal received from the first external input device 410.

According to various embodiments, the electronic device 400 may store information related to the ID of at least one external input device in the memory 405. When a specific application or function thereof is executed in the electronic device 400 in response to a touch input by the external input device corresponding to the ID, the above ID-related information may include information about the executed application or function. In addition, when two or more applications are executed by one external input device, the ID-related information stored in the memory 405 may further include information about execution details (e.g., an application execution sequence, execution start times, execution termination times, and the like) of such applications. In addition, the electronic device 400 may check whether the ID-related information included in the ID signal received from the first external input device 410 is stored in the memory 405.

According to various embodiments, the electronic device 400 may display a screen associated with an application corresponding to the ID through the display 409.

Meanwhile, although not shown in FIG. 4, the first external input device 410 may include a power supply module capable of supplying power to the respective elements of first external input device 410. For example, the power supply module of the first external input device 410 may include a rechargeable battery or use a primary battery. In another example, the power supply module of the first external input device 410 may have a component (e.g., an electric double-layer capacitor (ELDC)) capable of rectifying the electromotive force and induced current generated in the resonant circuit 417 by close proximity to the electronic device 400 and then storing in the form of internal power.

Figure 5:
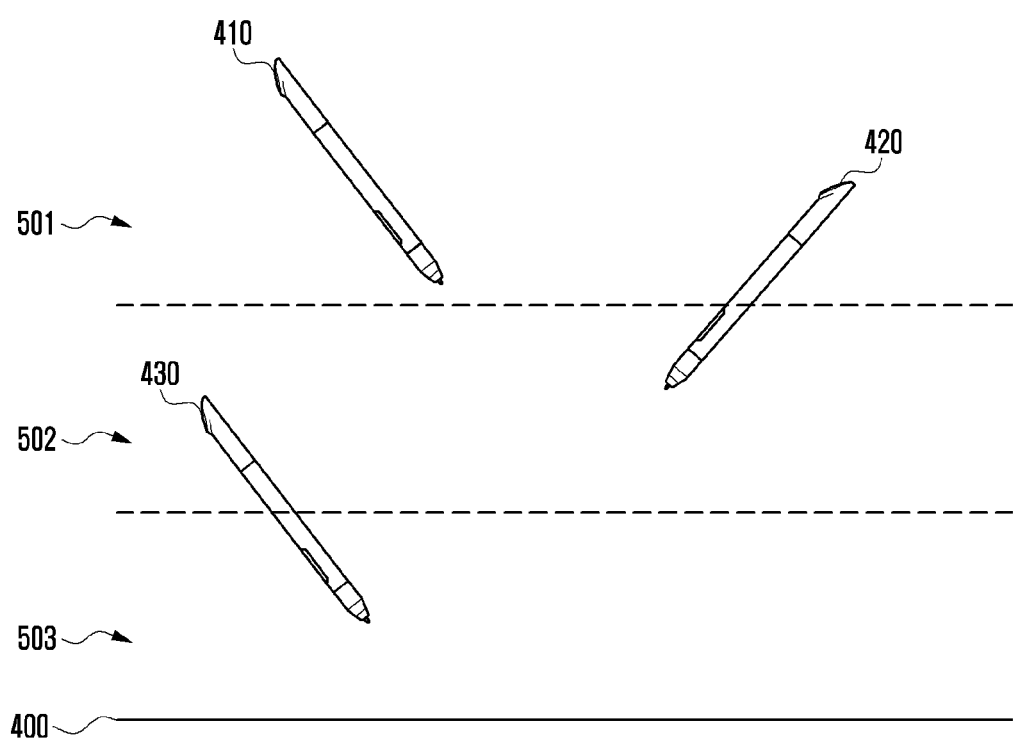
FIG. 5 illustrates a diagram for determining the location of an external electronic device according to various embodiments of the present disclosure.

FIG. 5 illustrates a diagram for determining the location of an external electronic device according to various embodiments of the present disclosure.

According to various embodiments, each of a second external input device 420 and a third external input device 430 may include all or part of the first external input device 410. In FIG. 5, the front surface of the electronic device 400 faces an upward direction, and the rear surface of the electronic device 400 faces a downward direction. The display 409 is disposed on the front surface of the electronic device 400.

According to various embodiments, each of the first external input device 410, the second external input device 420, and the third external input device 430 may transmit its own ID signal to the electronic device 400 via its own communication module. The electronic device 400 may search for the ID signals transmitted by the first, second, and third external input devices 410, 420, and 430 through the first communication module 401 and receive the ID signals.

According to various embodiments, the electronic device 400 may detect the strength of each ID signal received from each of the first, second, and third external input devices 410, 420, and 430 through the first communication module 401. The electronic device 400 may determine a distance between the electronic device 400 and each of the external input devices 410, 420, and 430 by, for example, comparing the strength of the ID signal with a threshold value for signal strength. This distance may mean a distance between the communication module of the electronic device 400 and the communication module of each of the external input devices 410, 420, and 430. Alternatively, this distance may mean a distance between the display 409 of the electronic device 400 and the pen tip of each of the external input devices 410, 420, and 430.

For example, when it is determined that the received signal strength of the ID signal received from the first external input device 410 is equal to or smaller than a first threshold value, the electronic device 400 may determine that the pen tip of the first external input device 410 is located in a first region 501. For example, when it is determined that the received signal strength of the ID signal received from the second external input device 420 is greater than the first threshold value and equal to or smaller than a second threshold value, the electronic device 400 may determine that the pen tip of the second external input device 420 is located in a second region 502. For example, when it is determined that the received signal strength of the ID signal received from the third external input device 430 is greater than the second threshold and equal to or smaller than a third threshold value, the electronic device 400 may determine that the pen tip of the third external input device 430 is located in a third region 503.

Based on the strength of the ID signal received from each of the external input devices 410, 420, and 430, the electronic device 400 may determine a numerical distance (e.g., centimeter, millimeter, etc.) between the electronic device 400 and each of the external input devices 410, 420, and 430.

In addition, the electronic device 400 may determine a relative distance between the electronic device 400 and each of the external input devices 410, 420, and 430. For example, when the strength of the ID signal received from the first external input device 410 is greater than that of the ID signal received from the second external input device 420, the electronic device 400 may determine that the first external input device 410 is located closer to the electronic device 400 than the second external input device 420.

Meanwhile, when a region allowing the electronic device 400 to detect a proximity input of a certain external input device through the digitizer panel is the third region 503, the electronic device 400 may detect a variation of the magnetic field caused by the third external input device 430 and thereby detect the proximity input of the third external input device 430. In this case, At this time, the electronic device 400 may determine that the third external input device 430 is located in the third region 503.

Figure 6A:
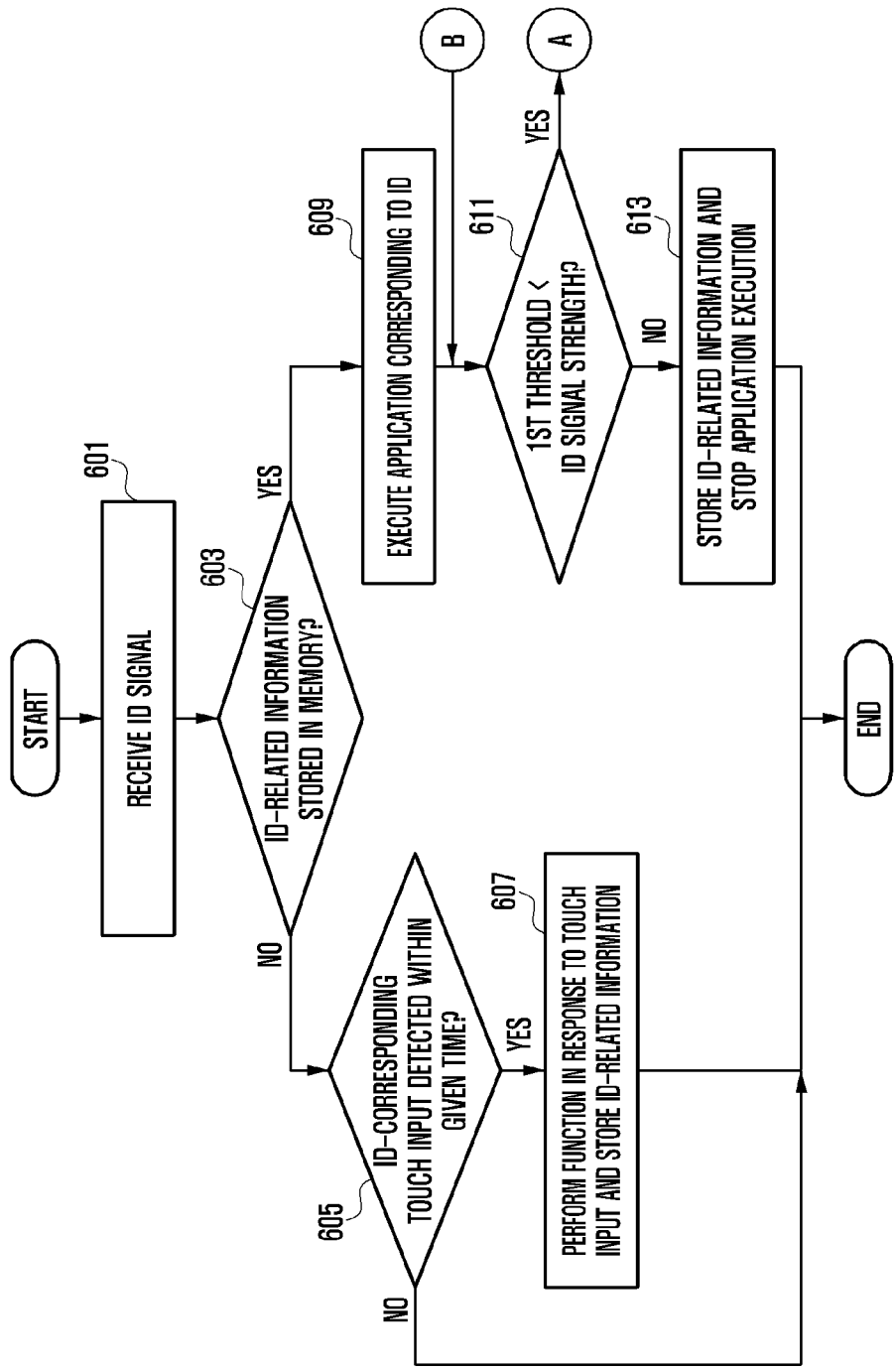
FIGS. 6A and 6B illustrate flow diagrams of an input processing method of an electronic device according to various embodiments of the present disclosure.
Figure 6B:
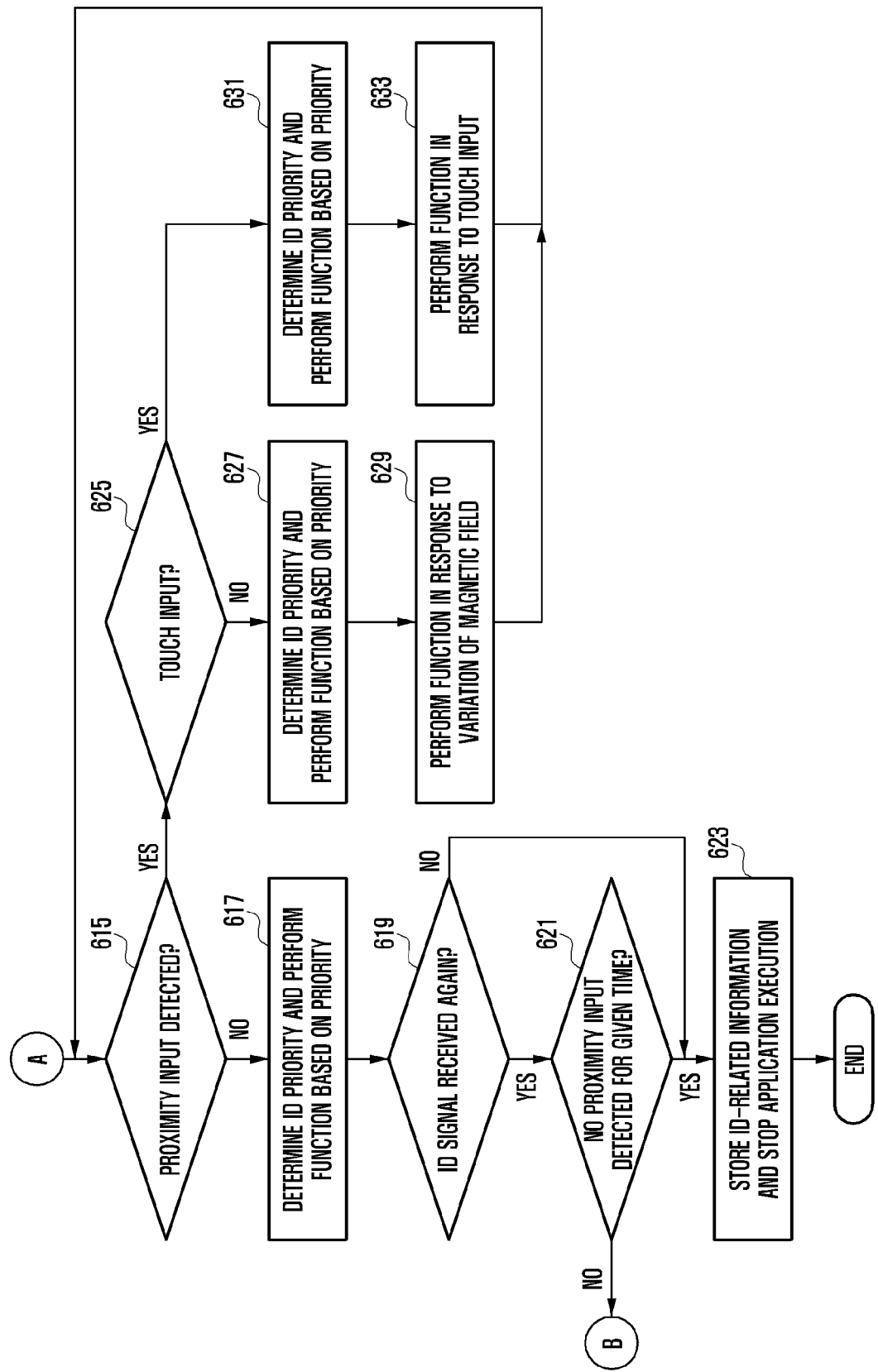

FIGS. 6A and 6B illustrate flow diagrams of an input processing method of an electronic device according to various embodiments of the present disclosure. According to various embodiments, when there are a plurality of external input devices, operations associated with the input processing method may be performed independently for each of the plurality of external input devices by at least one processor included in the electronic device.

Referring to FIG. 6A, at operation 601, a processor (e.g., the processor 403) of the electronic device may search for a signal of an external input device (e.g., the first external input device 410) through a communication module (e.g., the first communication module 401). For example, the external input device (e.g., the first external input device 410) may periodically transmit an ID signal by using a Bluetooth low energy based beacon technique which is one of wireless communication techniques. In this case, using the communication module (e.g., the first communication module 401), the processor (e.g., the processor 403) of the electronic device may search for the ID signal transmitted by the external input device (e.g., the first external input device 410). For example, the processor (e.g., the processor 403) of the electronic device may receive the ID signal, depending on whether the ID signal is found. If the ID signal transmitted by the external input device (e.g., the first external input device 410) is found, the processor (e.g., the processor 403) of the electronic device may receive the found ID signal through the communication module (e.g., the first communication module 401). At this time, the processor (e.g., the processor 403) of the electronic device may identify the ID of the external input device (e.g., the first external input device 410) contained in the received ID signal.

According to various embodiments, at operation 603, the processor (e.g., the processor 403) of the electronic device may determine whether information related to the ID contained in the received ID signal is stored in a memory (e.g., the memory 405). For example, the processor (e.g., the processor 403) of the electronic device may check whether information about a specific application or function thereof executed in response to a touch input by the external input device (e.g., the first external input device 410) corresponding to the ID is stored in the memory (e.g., the memory 405).

According to various embodiments, if the information related to the ID is not stored in the memory (e.g., the memory 405), the processor (e.g., the processor 403) of the electronic device may determine, at operation 605, whether a touch input by the external input device (e.g., the first external input device 410) corresponding to the ID is detected within a given time. For example, if the information related to the ID is not stored in the memory (e.g., the memory 405), the processor (e.g., the processor 403) of the electronic device may determine, through a touch panel included in an input unit (e.g., the input unit 407), whether the touch input by the external input device (e.g., the first external input device 410) corresponding to the ID is detected within the given time.

According to various embodiments, when the touch input by the external input device (e.g., the first external input device 410) corresponding to the ID is detected within the given time, the processor (e.g., the processor 403) may perform, at operation 607, a specific function in response to the touch input and then store information related to the ID in the memory (e.g., the memory 405). For example, in response to the touch input by the external input device (e.g., the first external input device 410) corresponding to the ID, the processor (e.g., the processor 403) of the electronic device may execute a specific application or perform a specific function of the application and then store related information in the memory (e.g., the memory 405).

According to various embodiments, if the information related to the ID is stored in the memory (e.g., the memory 405), the processor (e.g., the processor 403) of the electronic device may execute a specific application corresponding to the ID at operation 609, based on the ID-related information stored in the memory (e.g., the memory 405). At this time, the processor (e.g., the processor 403) of the electronic device may execute the application corresponding to the ID in a background process while not displaying a screen related to the executed application on a display (e.g., the display 409). On the other hand, if the application corresponding to the ID has been already executed, the processor (e.g., the processor 403) of the electronic device may omit this operation 609. In addition, the processor (e.g., the processor 403) of the electronic device may determine the setting for the executed application, based on setting information for the application corresponding to the ID stored in the memory (e.g., the memory 405).

According to various embodiments, at operation 611, the processor (e.g., the processor 403) of the electronic device may detect the strength of the received ID signal. For example, the processor (e.g., the processor 403) of the electronic device may detect the ID signal strength by calculating the received signal strength of the ID signal. In addition, the processor (e.g., the processor 403) of the electronic device may compare the strength of the ID signal with a threshold value for signal strength. For example, the processor (e.g., the processor 403) of the electronic device may determine whether the detected strength of the ID signal exceeds a first threshold value.

According to various embodiments, if it is determined that the strength of the ID signal does not exceed the first threshold value, the processor (e.g., the processor 403) of the electronic device may store, at operation 613, the ID-related information in the memory (e.g., the memory 405) and also stop the execution of the application corresponding to the ID. For example, the processor (e.g., the processor 403) of the electronic device may terminate the application corresponding to the ID and being executed in the background process.

On the other hand, if the application corresponding to the ID is equal to the application corresponding to the ID of another external input device (e.g., the second external input device 420) and being executed in the electronic device, the processor (e.g., the processor 403) of the electronic device may omit this operation 613.

According to various embodiments, when it is determined that the strength of the ID signal exceeds the first threshold value, the processor (e.g., the processor 403) of the electronic device may detect, at operation 615, a proximity input by the external input device (e.g., the first external input device 410) corresponding to the ID. For example, through a digitizer panel included in an input unit (e.g., the input unit 407), the processor (e.g., processor 403) of the electronic device may detect the proximity input by the external input device (e.g., the first external input device 410) and determine the coordinates corresponding to the proximity input. In addition, when the proximity input by the external input device (e.g., the first external input device 410) corresponding to the ID is detected, the processor (e.g., the processor 403) of the electronic device may temporarily store, in the memory (e.g., the memory 405), information about a detection time of the proximity input and/or a detection terminated time of the proximity input according to each ID.

According to various embodiments, if the proximity input by the external input device (e.g., the first external input device 410) corresponding to the ID is not detected, the processor (e.g., the processor 403) of the electronic device may determine the priority of the ID at operation 617 and, based on the priority, perform a function of a specific application corresponding to the ID. The priority may be determined, for example, by considering a detection time or detection terminated time of the proximity input by the external input device (e.g., the first external input device 410) corresponding to the ID or a detection time or detection terminated time of the touch input by the external input device (e.g., the first external input device 410).

For example, if applications corresponding to the first and second external input devices 410 and 420 are an Internet browser (e.g., the browser 375) and a media player (e.g., the media player 382), respectively, and if the priority of the first external input device 410 is higher than the priority of the first external input device 420, the processor (e.g., the processor 403) of the electronic device may display a screen associated with the Internet browser on a display (e.g., the display 409) and also execute the media player in a background process.

According to various embodiments, at operation 619, the processor (e.g., the processor 403) of the electronic device may determine whether an ID signal having the priority-determined ID is received again through the communication module (e.g., the first communication module 401).

According to various embodiments, if the ID signal having the priority-determined ID is received again, the processor (e.g., the processor 403) of the electronic device may determine, at operation 621, whether a time for which the proximity input by the external input device (e.g., the first external input device 410) corresponding to the ID is not detected exceeds a given time, based on the information about the detection time of the proximity input stored in the memory (e.g., the memory 405) according to each ID.

According to various embodiments, if it is determined at operation 619 that the ID signal having the priority-determined ID is not received again, or if it is determined at operation 621 that the time for which the proximity input by the external input device (e.g., the first external input device 410) corresponding to the ID is not detected exceeds the given time, the processor (e.g., the processor 403) may store, at operation 623, the ID-related information in the memory (e.g., the memory 405) and then terminate the execution of the application corresponding to the ID and being executed in the electronic device. For example, the processor (e.g., the processor 403) of the electronic device may terminate the execution of the application corresponding to the ID and being executed in the background process. On the other hand, if the application corresponding to the ID is equal to the application corresponding to the ID of another external input device (e.g., the second external input device 420) and being executed in the electronic device, the processor (e.g., the processor 403) of the electronic device may not terminate the execution of the application corresponding to the ID.

According to various embodiments, if the time for which the proximity input by the external input device (e.g., the first external input device 410) corresponding to the ID is not detected does not exceed the given time at operation 621, the processor (e.g., the processor 403) may proceed to the operation 611 and detect the strength of the re-received ID signal.

According to various embodiments, when the proximity input by the external input device (e.g., the first external input device 410) corresponding to the ID is detected at operation 615, the processor (e.g., the processor 403) may detect, at operation 625, a touch input by the external input device (e.g., the first external input device 410) corresponding to the ID. For example, through a touch panel included in an input unit (e.g., the input unit 407), the processor (e.g., processor 403) of the electronic device may detect the touch input by the external input device (e.g., the first external input device 410) and determine the coordinates corresponding to the touch input. In addition, when the touch input by the external input device (e.g., the first external input device 410) corresponding to the ID is detected, the processor (e.g., the processor 403) of the electronic device may temporarily store, in the memory (e.g., the memory 405), information about a detection time of the touch input and/or a detection terminated time of the touch input according to each ID.

According to various embodiments, if the touch input by the external input device (e.g., the first external input device 410) corresponding to the ID is not detected, the processor (e.g., the processor 403) of the electronic device may determine the priority of the ID at operation 627 and, based on the priority, perform a function of a specific application corresponding to the ID.

According to various embodiments, at operation 629, the processor (e.g., the processor 403) of the electronic device may perform a specific function in response to a variation in magnetic field caused by the external input device (e.g., the first external input device 410). For example, when the user manipulates a physical button of the external input device (e.g., the first external input device 410), the processor (e.g., the processor 403) of the electronic device may detect an additional variation of magnetic field caused by the external input device (e.g., the first external input device 410) through the digitizer panel included in the input unit (e.g., the input unit 407) and also perform a specific function according to the variation of magnetic field.

On the other hand, if the proximity input by the external input device (e.g., the first external input device 410) is detected for a certain time, and even if no additional variation of magnetic field caused by the external input device (e.g., the first external input device 410) is detected, the processor (e.g., the processor 403) of the electronic device may perform a specific function according to the variation of magnetic field.

According to various embodiments, when the touch input by the external input device (e.g., the first external input device 410) corresponding to the ID is detected at operation 625, the processor (e.g., the processor 403) of the electronic device may determine the priority of the ID at operation 631 and, based on the priority, perform a function of a specific application corresponding to the ID.

According to various embodiments, at operation 633, the processor (e.g., the processor 403) of the electronic device may perform a specific function in response to the touch input.

Figure 7:
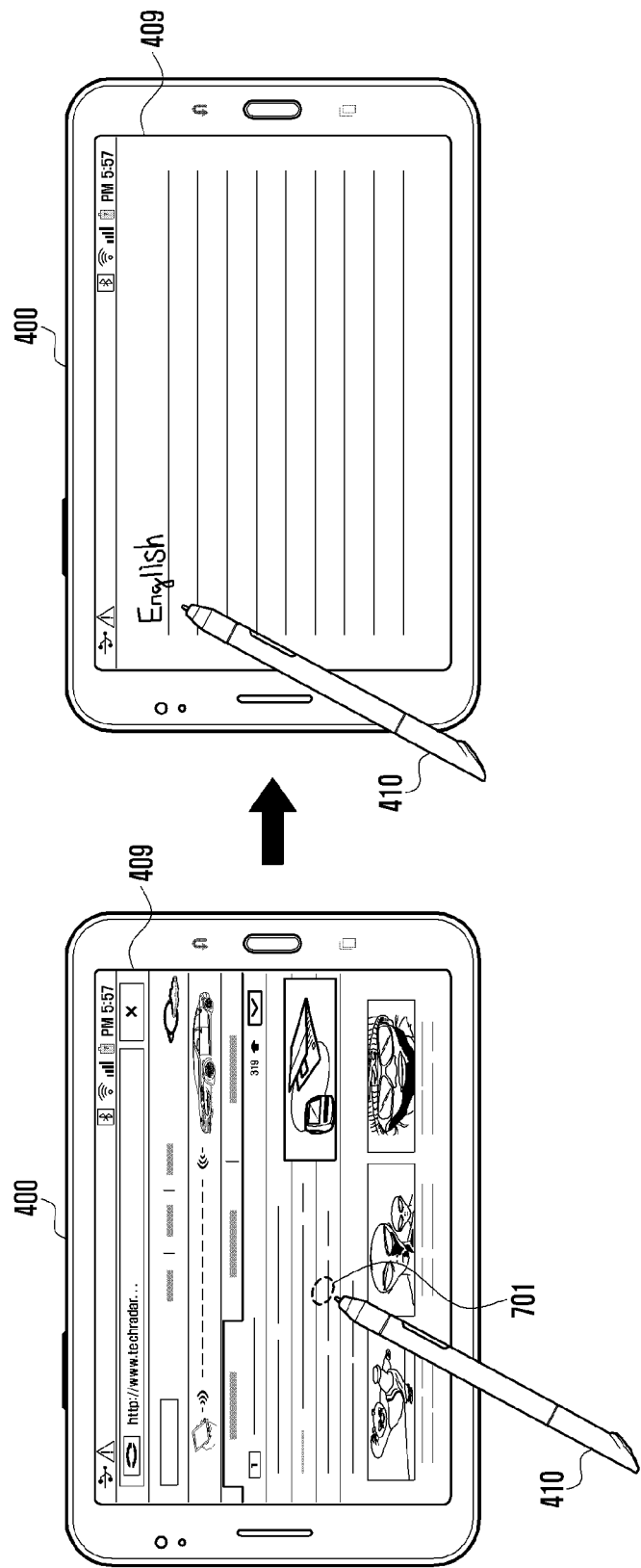
FIG. 7 illustrates a diagram for performing a function corresponding to an external input device in an electronic device according to various embodiments of the present disclosure.

FIG. 7 illustrates a diagram for performing a function corresponding to an external input device in an electronic device according to various embodiments of the present disclosure.

As shown in FIG. 7, while displaying a screen associated with an Internet browser (e.g., the browser 375) on the display 409, the electronic device 400 may receive an ID signal from the first external input device 410 and detect a proximity input 701 by the first external input device 410. At this time, the electronic device 400 may identify information related to the ID of the first external input device 410 stored in a memory (e.g., the memory 405) and then execute, for example, a memo application, which corresponds to the ID of the first external input device 410, in a background process. Meanwhile, the memo application may have been already executed in a background process when the ID signal is received. In addition, if a proximity input by an external input device other than the first external input device 410 is not detected, the electronic device 400 may determine that the priority of the ID of the first external input device 410 is the first priority. In this case, if the proximity input 701 by the first external input device 410 is continuously detected for a given time, the electronic device 400 may display, on the display 409, a screen associated with the memo application being executed in the background process.

Figure 8A:
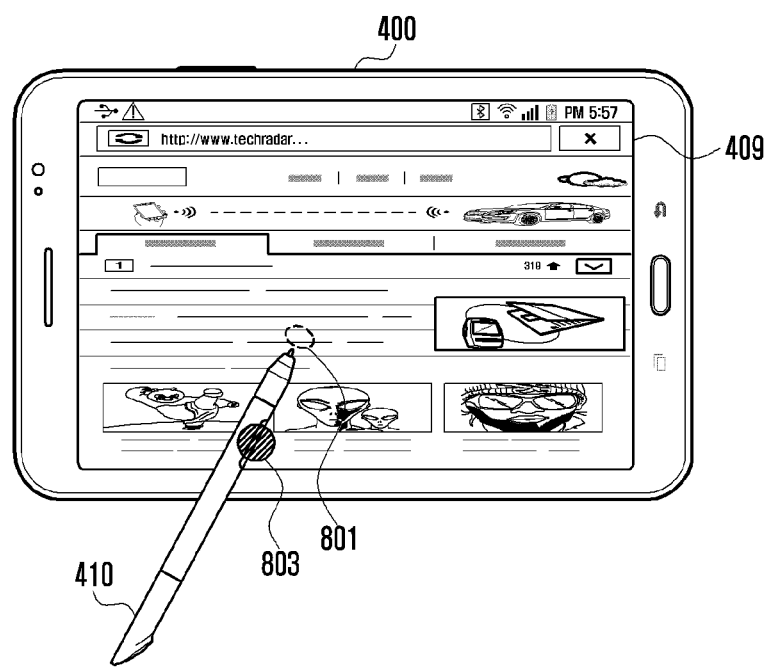
FIGS. 8A, 8B, and 8C illustrate diagrams for performing a function corresponding to an external input device in an electronic device according to various embodiments of the present disclosure.
Figure 8B:
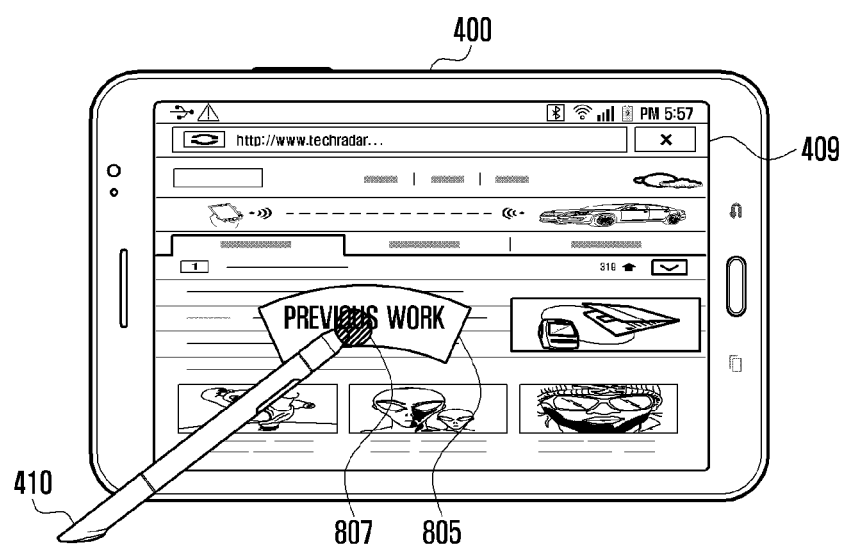
Figure 8C:
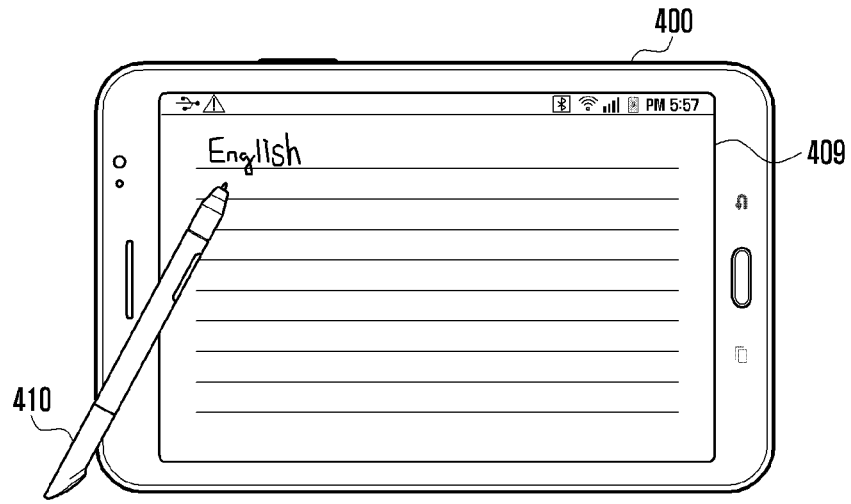

FIGS. 8A, 8B, and 8C illustrate diagrams for performing a function corresponding to an external input device in an electronic device according to various embodiments of the present disclosure.

As shown in FIG. 8A, while displaying a screen associated with an Internet browser on the display 409, the electronic device 400 may receive an ID signal from the first external input device 410 and detect a proximity input 801 by the first external input device 410. At this time, the electronic device 400 may identify information related to the ID of the first external input device 410 stored in a memory (e.g., the memory 405) and then execute, for example, a memo application, which corresponds to the ID of the first external input device 410, in a background process. Meanwhile, the memo application may have been already executed in a background process when the ID signal is received. In addition, if a proximity input by an external input device other than the first external input device 410 is not detected, the electronic device 400 may determine that the priority of the ID of the first external input device 410 is the first priority.

In this case, the electronic device 400 may determine a screen associated with the application displayed on the display 409, based on the priority of the ID of the first external input device 410 as described above with reference to FIG. 7, or based on a user input. For example, if the user manipulates a physical button 803 included in the first external input device 410, the electronic device 400 may detect an additional variation of magnetic field caused by the first external input device 410.

Then, as shown in FIG. 8B, the electronic device 400 may display on the display 409 a user interface 805 that allows the user to select whether to continue a previous operation. At this time, the electronic device 400 may identify coordinates where the additional variation of magnetic field caused by the first external input device 410 is detected. In addition, the electronic device 400 may display the user interface 805 at a position corresponding to the identified coordinates. Then, the user may select to continue the previous operation through a touch input 807 by the first external input device 410.

As shown in FIG. 8C, when the user selects to continue the previous operation through the touch input 807 by the first external input device 410, the electronic device 400 may displays on the display 409 a screen associated with a memo application, for example, being executed in a background process. On the other hand, if the user does not select to continue the previous operation, the electronic device 400 may continuously display the screen associated with the Internet browser on the display 409.

FIGS. 9A, 9B, 9C, and 9D illustrate diagrams for performing a function corresponding to an external input device in an electronic device according to various embodiments of the present disclosure.

Figure 9A:
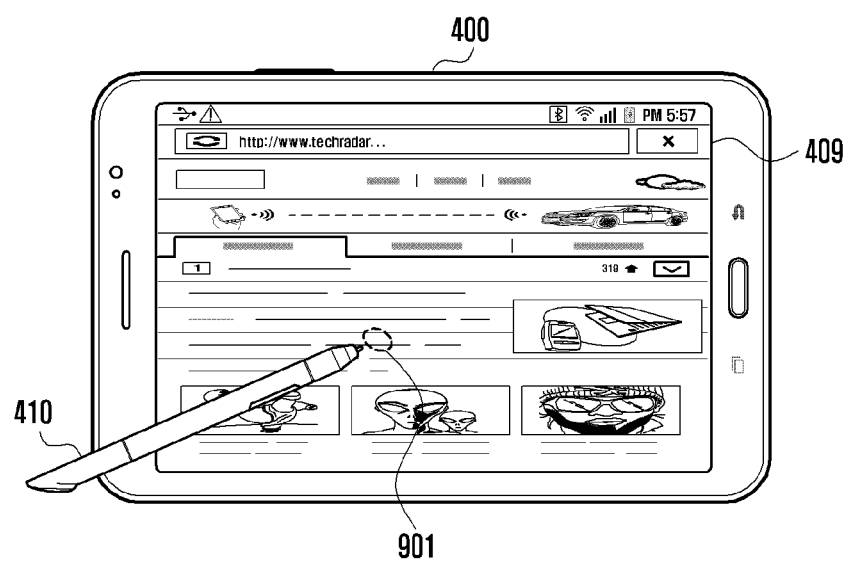
FIGS. 9A, 9B, 9C, and 9D illustrate diagrams for performing a function corresponding to an external input device in an electronic device according to various embodiments of the present disclosure.

As shown in FIG. 9A, while displaying a screen associated with an Internet browser on the display 409, the electronic device 400 may receive an ID signal from the first external input device 410 and detect a proximity input (e.g., a hovering input) 901 by the first external input device 410. At this time, the electronic device 400 may identify information (e.g., the execution sequence, execution start times, execution termination times, etc. of applications) related to the ID of the first external input device 410 stored in a memory (e.g., the memory 405). In addition, based on the identified ID-related information, the electronic device 400 may execute, in a background process, a memo application, a media player, and a map application, for example, all of which correspond to the ID of the first external input device 410. Meanwhile, at least one of the memo application, the media player, and the map application may have been already executed in a background process when the ID signal is received.

Figure 9B:
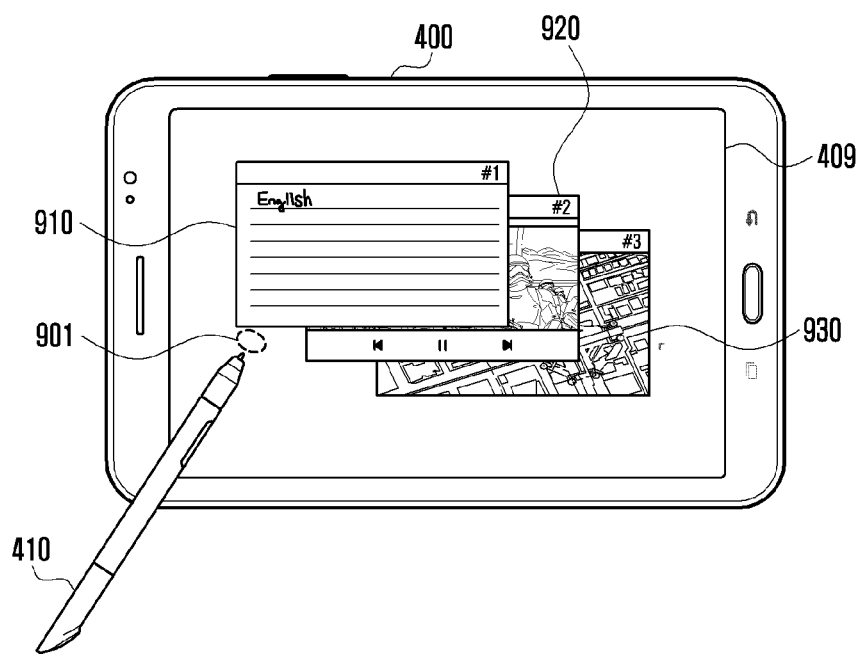

As shown in FIG. 9B, when the proximity input 901 by the first external input device 410 is continuously detected for a given time, the electronic device 400 may display on the display 409 a screen associated with a multitasking function, i.e., a multitasking screen, that allows the user to select one of the memo application, the media player, and the map application all of which are being executed in the background process. At this time, based on the ID-related information (e.g., the execution sequence, execution start times, execution termination times, etc. of applications), the electronic device 400 may determine the arrangement order of an image 910 of the memo application, an image 920 of the media player, and an image 930 of the map application.

Figure 9C:
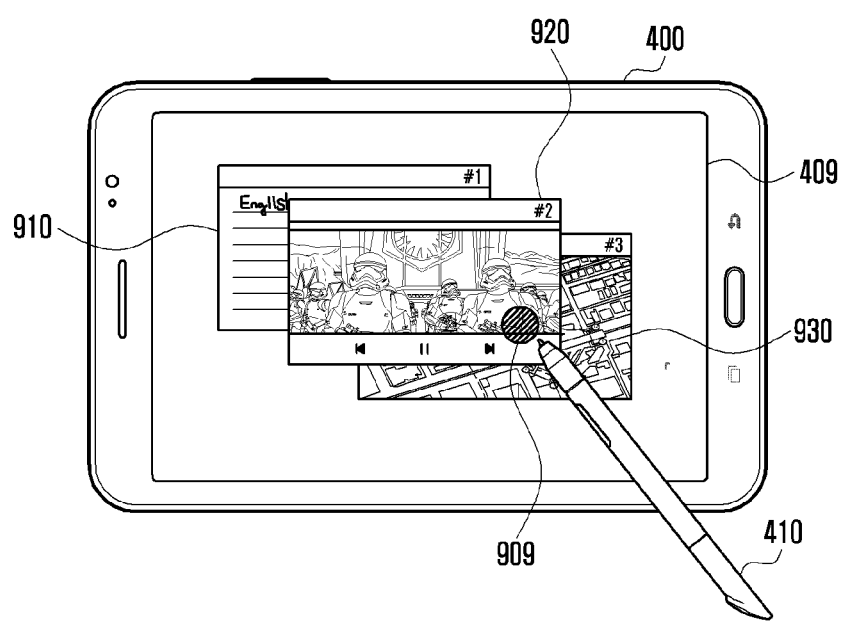

As shown in FIG. 9C, the electronic device 400 may identify the coordinates where the proximity input by the first external input device 410 is detected, and may determine an arrangement order of images of applications displayed on a multitasking screen, based on the identified coordinates. For example, if an application corresponding to the proximity input detected coordinates is a media player, the electronic device 400 may display first the image 920 of the media player among images displayed on the multitasking screen.

On the other hand, the electronic device 400 may identify the coordinate where a touch input 903 by the first external input device 410 is detected, and may determine, based on the identified coordinates, that the user selects the image 920 of the media player.

Figure 9D:
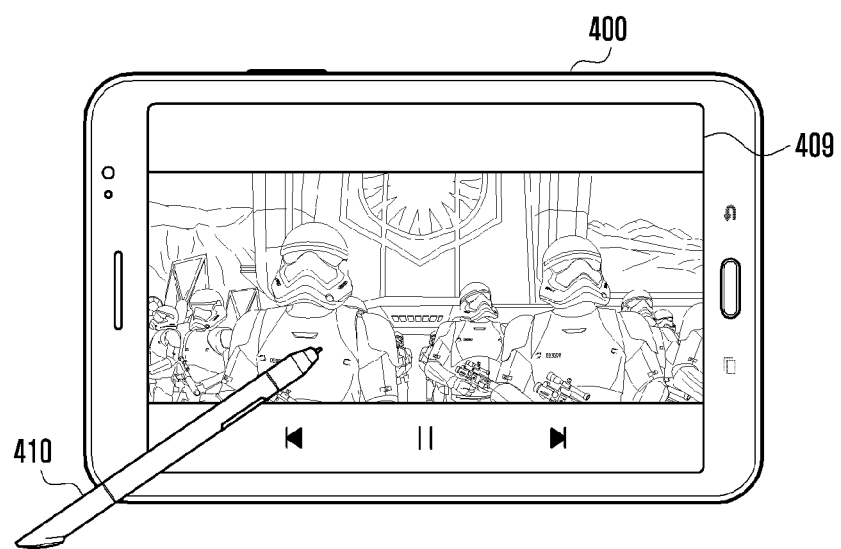

As shown in FIG. 9D, the electronic device 400 may display on the display 409 a screen associated with the media player selected through the touch input by the first external input device 410.

FIGS. 10A, 10B, 10C, and 10D illustrate diagrams for performing functions corresponding to respective external input devices in an electronic device according to various embodiments of the present disclosure.

Figure 10A:
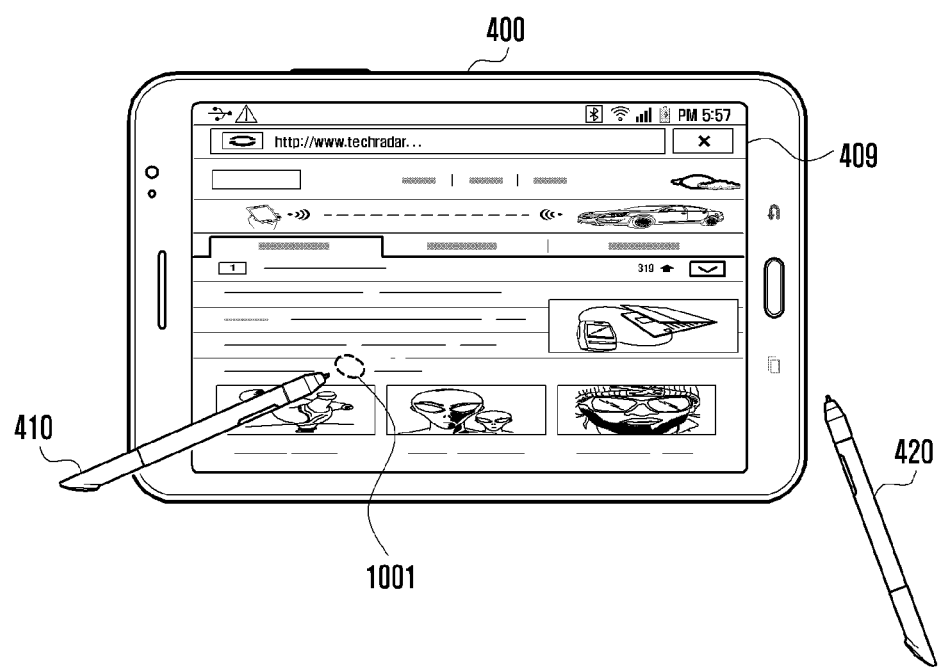
FIGS. 10A, 10B, 10C, and 10D illustrate diagrams for performing functions corresponding to respective external input devices in an electronic device according to various embodiments of the present disclosure.

As shown in FIG. 10A, while displaying a screen associated with an Internet browser on the display 409, the electronic device 400 may receive ID signals from the first external input device 410 and the second external input device 420. At this time, the electronic device 400 may identify information (e.g., the execution sequence, execution start times, execution termination times, etc. of applications) related to the IDs of the first and second external input devices 410 and 420 in a memory (e.g., the memory 405).

Then, based on the identified information related to the ID of the first external input device 410, the electronic device 400 may execute, in a background process, a memo application, a media player, and a map application, for example, all of which correspond to the ID of the first external input device 410. Meanwhile, at least one of the memo application, the media player, and the map application may have been already executed in a background process when the ID signal is received from the first external input device 410.

In addition, based on the identified information related to the ID of the second external input device 420, the electronic device 400 may execute an Internet browser and a photo manager application, for example, both of which correspond to the ID of the second external input device 420. Meanwhile, at least one of the Internet browser and the photo manager application may have been already executed in a background process when the ID signal is received from the second external input device 420.

For example, the electronic device 400 may detect a proximity input (e.g., a hovering input) 1001 by the first external input device 410. Since only the proximity input 1001 by the first external input device 410 is detected, the electronic device 400 may determine the priority of the ID of the first external input device 410 as the first priority and also determine the priority of the ID of the second external input device 420 as the second order.

Figure 10B:
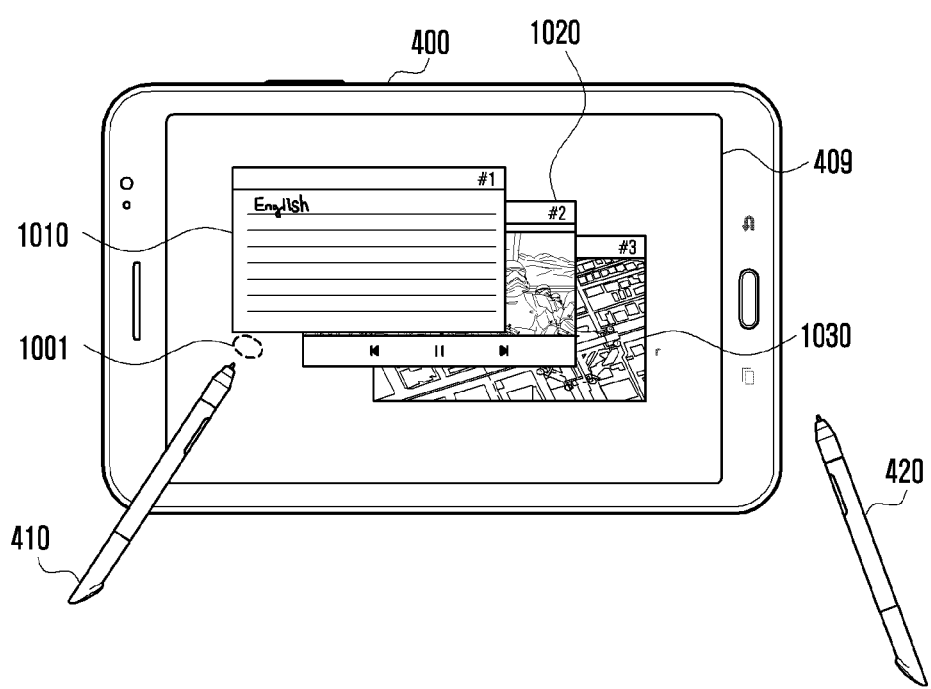

As shown in FIG. 10B, when the proximity input 1001 by the first external input device 410 is continuously detected for a given time, the electronic device 400 may display on the display 409 a multitasking screen that allows the user to select one of the memo application, the media player, and the map application all of which correspond to the ID of the first external input device 410. At this time, based on the ID-related information (e.g., the execution sequence, execution start times, execution termination times, etc. of applications), the electronic device 400 may determine the arrangement order of an image 1010 of the memo application, an image 1020 of the media player, and an image 1030 of the map application. On the other hand, if no image among the images 1010, 1020, and 1030 of the applications displayed on the display 409 is selected, and if no proximity input by the first external input device 410 is detected, the electronic device 400 may display again the screen associated with the Internet browser on the display 409.

Figure 10C:
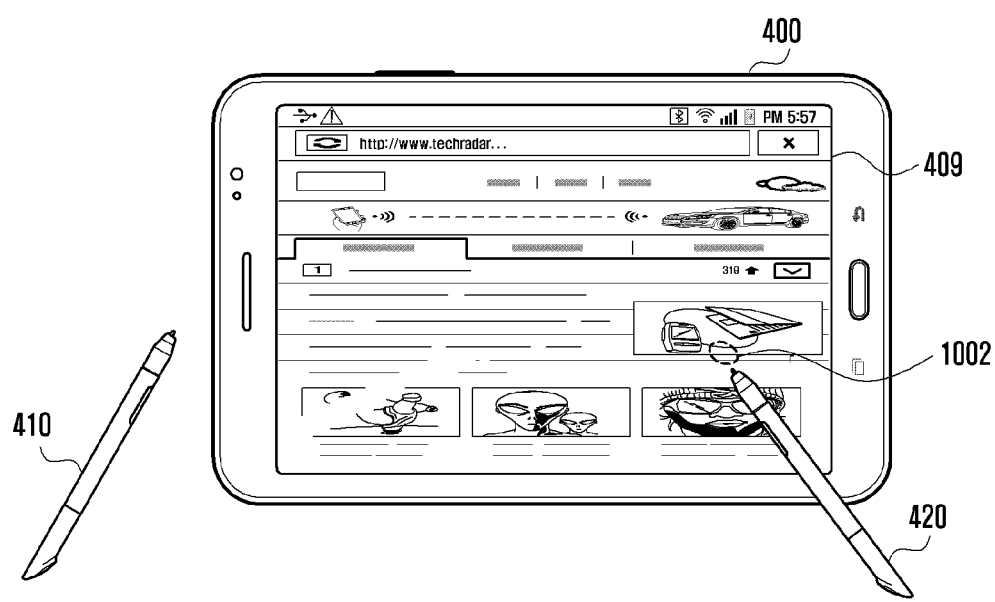

As shown in FIG. 10C, while the screen associated with the Internet browser is displayed again on the display 409, the electronic device 400 may detect a proximity input 1002 by the second external input device 420.

Figure 10D:
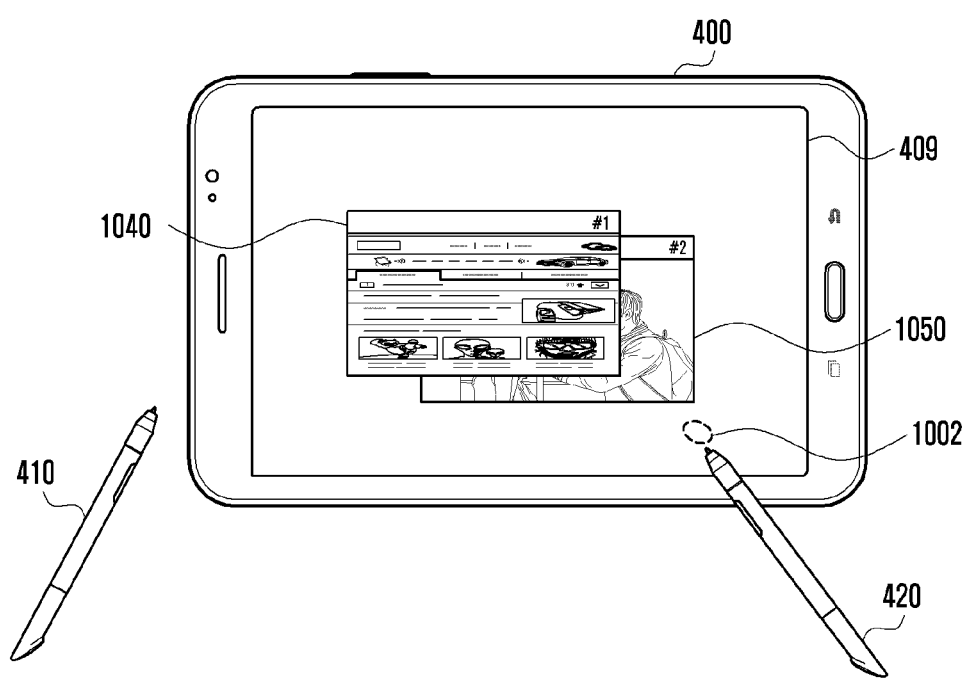

As shown in FIG. 10D, when the proximity input 1002 by the second external input device 420 is continuously detected for a given time, the electronic device 400 may display on the display 409 a multitasking screen that allows the user to select one of the Internet browser and the photo manager application both of which correspond to the ID of the second external input device 420. At this time, based on the ID-related information (e.g., the execution sequence, execution start times, execution termination times, etc. of applications), the electronic device 400 may determine the arrangement order of an image 1040 of the Internet browser and an image 1050 of the photo manager application.

Figure 11A:
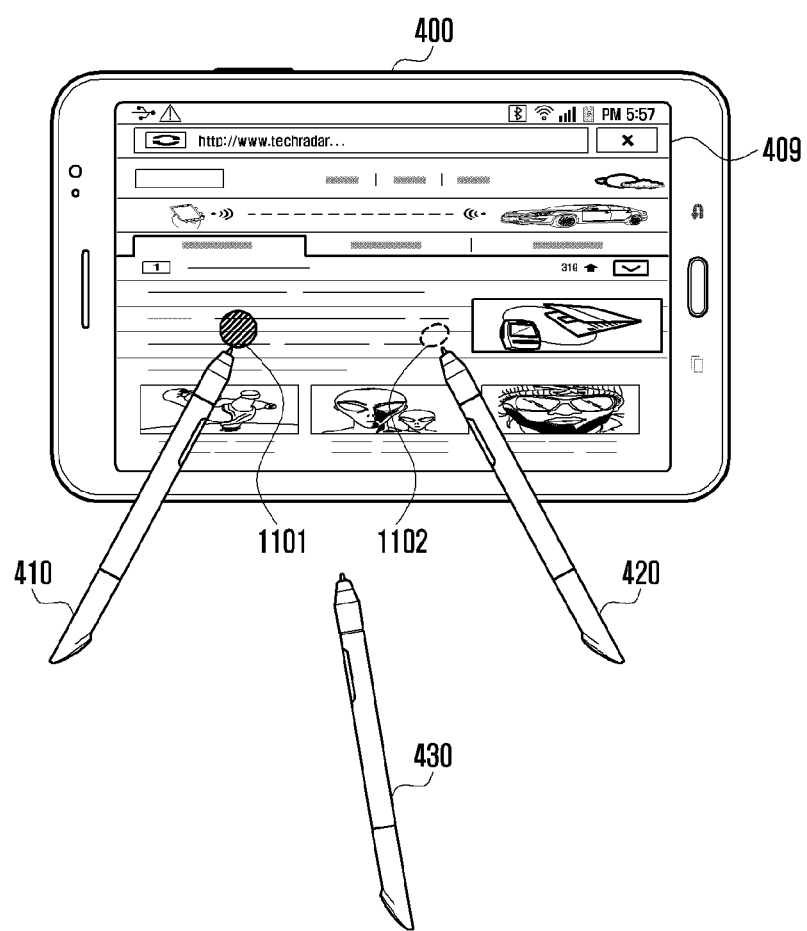
FIGS. 11A, 11B, and 11C illustrate diagrams for displaying a screen according to the priorities of external input devices in an electronic device according to various embodiments of the present disclosure.
Figure 11B:
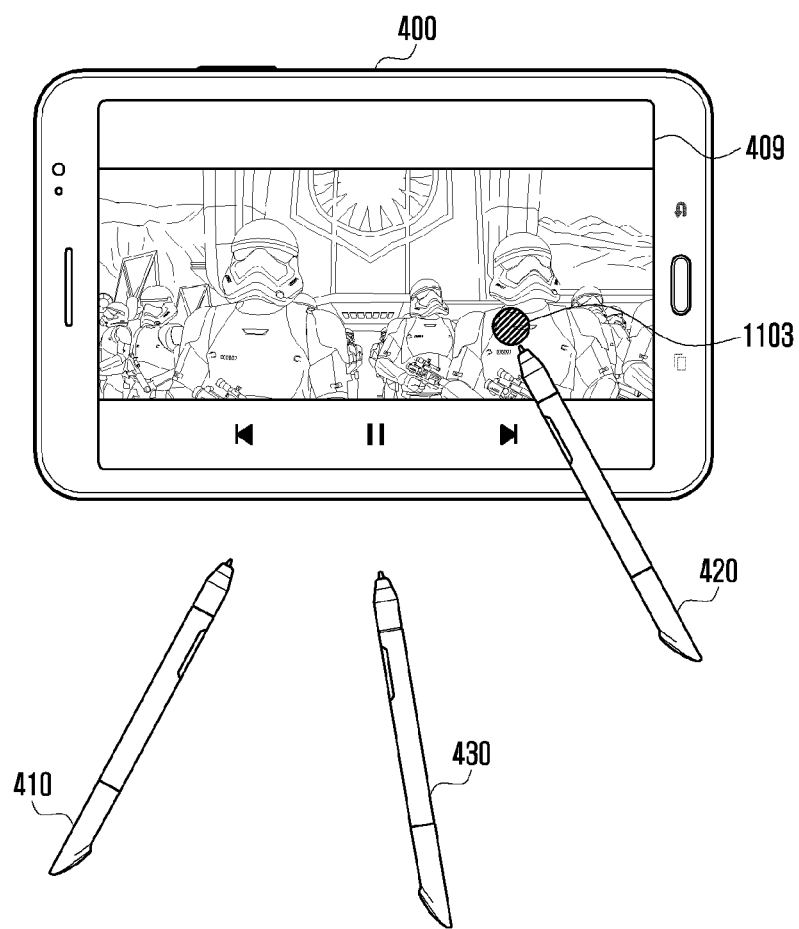
Figure 11C:
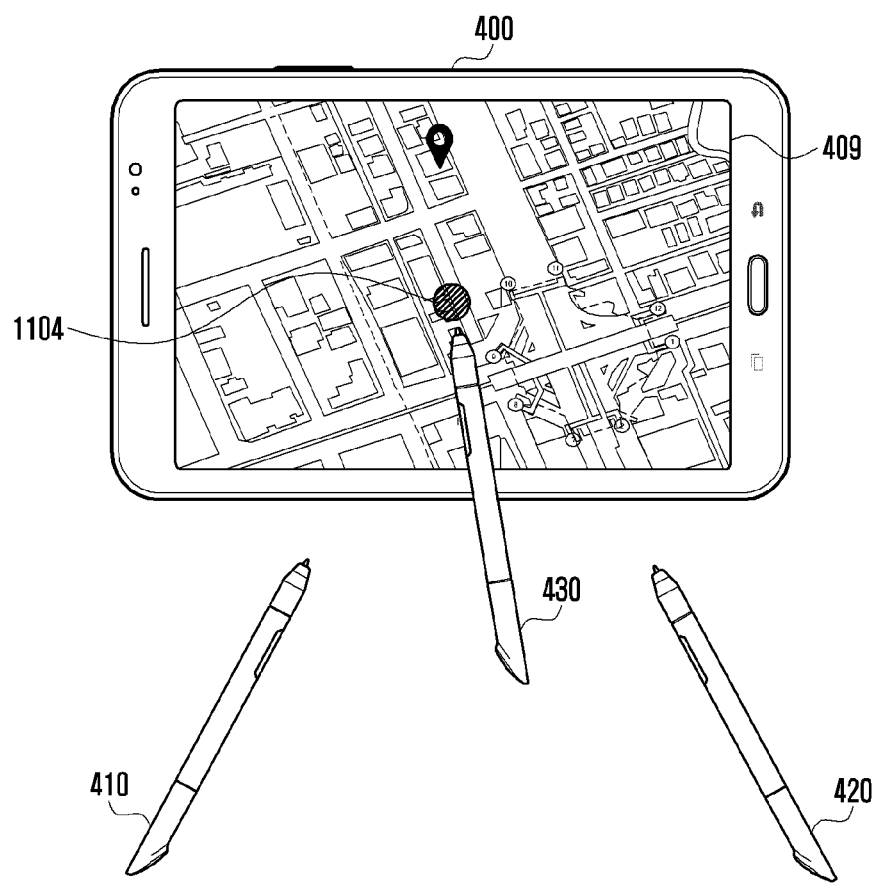

FIGS. 11A, 11B, and 11C illustrate diagrams for displaying a screen according to the priorities of external input devices in an electronic device according to various embodiments of the present disclosure.

As shown in FIG. 11A, the electronic device 400 may receive ID signals from the first external input device 410, the second external input device 420, and the third external input device 430, respectively. If a touch input 1101 by the first external input device 410 is detected, if a proximity input 1102 (e.g., a hovering input) by the second external input device 420 is detected, and if the strength of the ID signal received from the third external input device 430 exceeds a first threshold value, the electronic device 400 may determine that the priorities of the IDs of the first, second, and third external input devices 410, 420, and 430 are the first, second, and third priorities, respectively. Then, the electronic device 400 may display on the display 409 a screen associated with an Internet browser (e.g., the browser 375) corresponding to the ID of the first external input device 410. On the other hand, the electronic device 400 may execute applications corresponding to the IDs of the second and third external input devices 420 and 430 in a background process.

As shown in FIG. 11B, if a touch input 1103 by the second external input device 420 is detected, and if the strength of the ID signal received from each of the first and third external input devices 410 and 430 exceeds the first threshold value, the electronic device 400 may determine that the priority of the ID of the second external input device 420 is the first priority, and may also determine that the priorities of the IDs of the first and third external input devices 410 and 430 are the second and third priorities, respectively, by considering a time point when the touch input 1101 by the first external input device 410 is detected as shown in FIG. 11A. Then, the electronic device 400 may display on the display 409 a screen associated with a media player (e.g., the media player 382) corresponding to the ID of the second external input device 420. On the other hand, the electronic device 400 may execute applications corresponding to the IDs of the first and third external input devices 410 and 430 in a background process.

As shown in FIG. 11C, if a touch input 1104 by the third external input device 430 is detected, and if the strength of the ID signal received from each of the first and second external input devices 410 and 420 exceeds the first threshold value, the electronic device 400 may determine that the priority of the ID of the third external input device 430 is the first priority, and may also determine that the priorities of the IDs of the first and second external input devices 410 and 420 are the third and second priorities, respectively, by considering a time point when the touch input 1101 by the first external input device 410 is detected in FIG. 11A, and by further considering a time point when the touch input 1103 by the second external input device 420 is detected in FIG. 11B. Then, the electronic device 400 may display on the display 409 a screen associated with a map application corresponding to the ID of the third external input device 430. On the other hand, the electronic device 400 may execute applications corresponding to the IDs of the first and second external input devices 410 and 430 in a background process.

FIGS. 12A, 12B, 12C, and 12D illustrate diagrams for displaying a plurality of screens according to the priorities of external input devices in an electronic device according to various embodiments of the present disclosure.

Figure 12A:
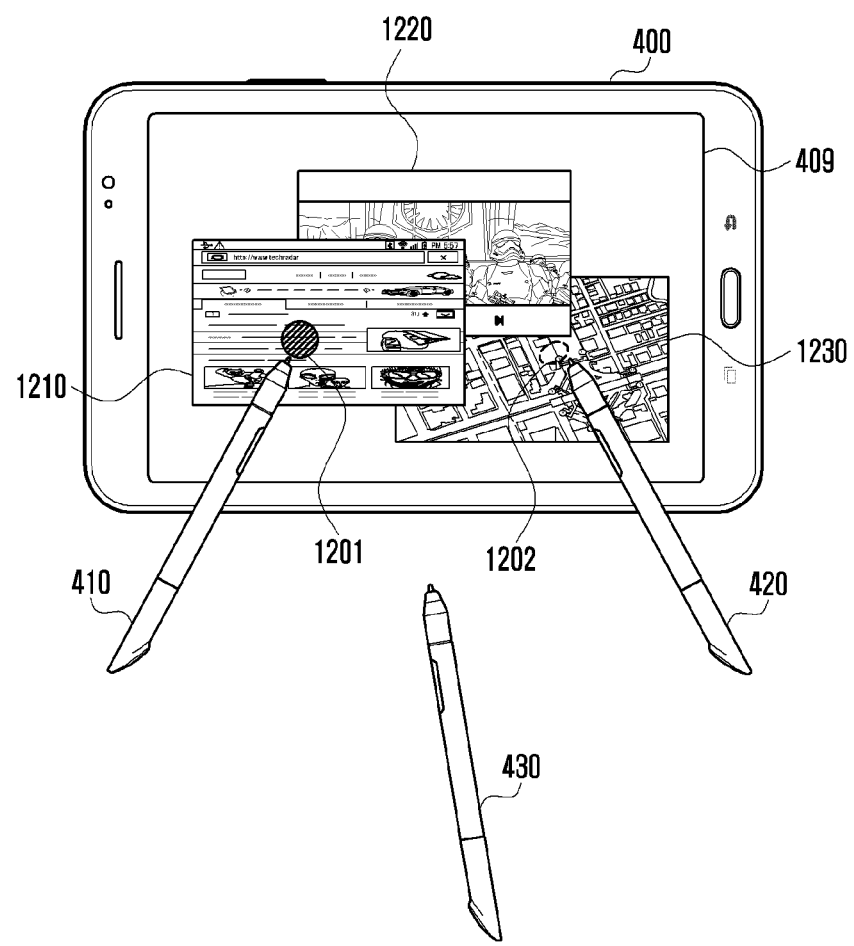
FIGS. 12A, 12B, 12C, and 12D illustrate diagrams for displaying a plurality of screens according to the priorities of external input devices in an electronic device according to various embodiments of the present disclosure.

As shown in FIG. 12A, the electronic device 400 may provide a multi-window function for displaying a plurality of screens associated with applications together on the display 409. In this case, the electronic device 400 may determine the arrangement of the plurality of screens displayed on the display 409, based on the priorities of the IDs of the external input devices. For example, the electronic device 400 may receive ID signals from the first external input device 410, the second external input device 420, and the third external input device 430, respectively. If a touch input 1201 by the first external input device 410 is detected, if a proximity input 1202 by the second external input device 420 is detected, and if the strength of the ID signal received from the third external input device 430 exceeds a first threshold value, the electronic device 400 may determine that the priorities of the IDs of the first, second, and third external input devices 410, 420, and 430 are the first, second, and third priorities, respectively. Then, the electronic device 400 may arrange a screen 1210 associated with an Internet browser (e.g., the browser 375) corresponding to the ID of the first external input device 410, a screen 1220 associated with a media player (e.g., the media player 382) corresponding to the ID of the second external input device 420, and a screen 1230 associated with a map application corresponding to the ID of the third external input device 430 according to the priorities and then display the screens on the display 409.

Figure 12B:
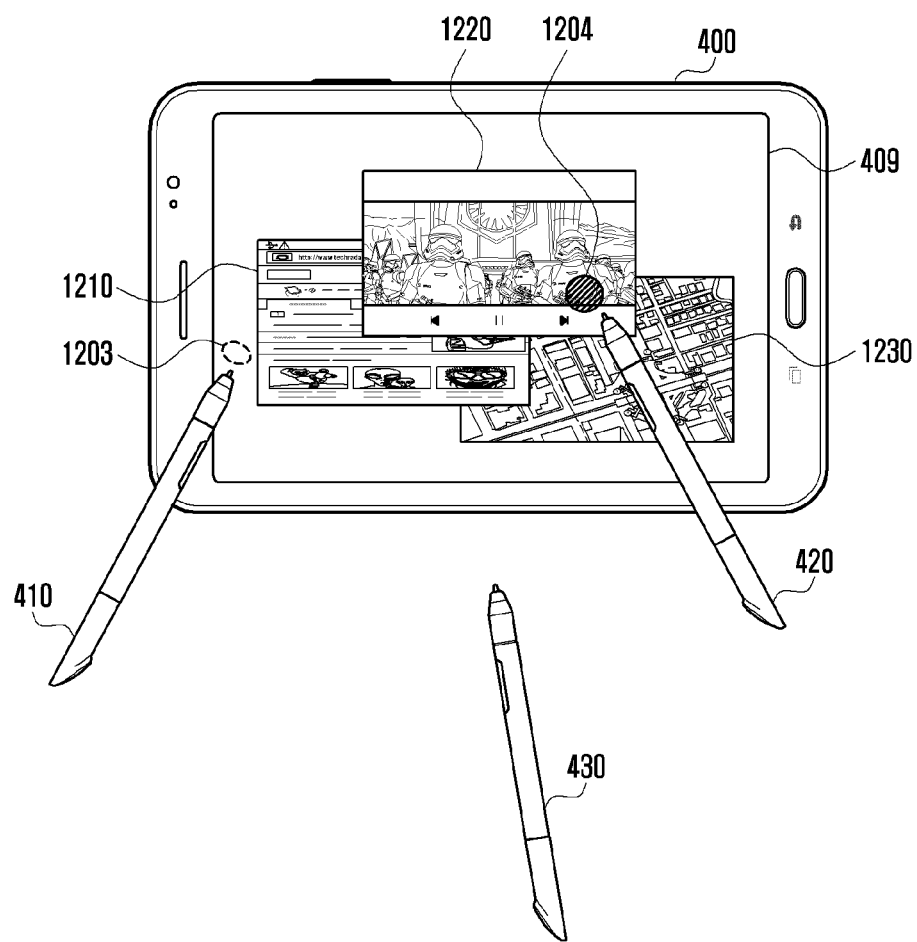

As shown in FIG. 12B, if a proximity input 1203 by the first external input device 410 is detected, if a touch input 1204 by the second external input device 420 is detected, and if the strength of the ID signal received from the third external input device 430 exceeds the first threshold value, the electronic device 400 may determine that the priorities of the IDs of the first, second, and third external input devices 410, 420, and 430 are the second, first, and third priorities, respectively. Then, the electronic device 400 may arrange the screens 1210, 1220, and 1230 associated with applications corresponding to the IDs of the first, second, and third external input devices 410, 420, and 430, respectively, according to the priorities and then display the screens on the display 409.

Figure 12C:
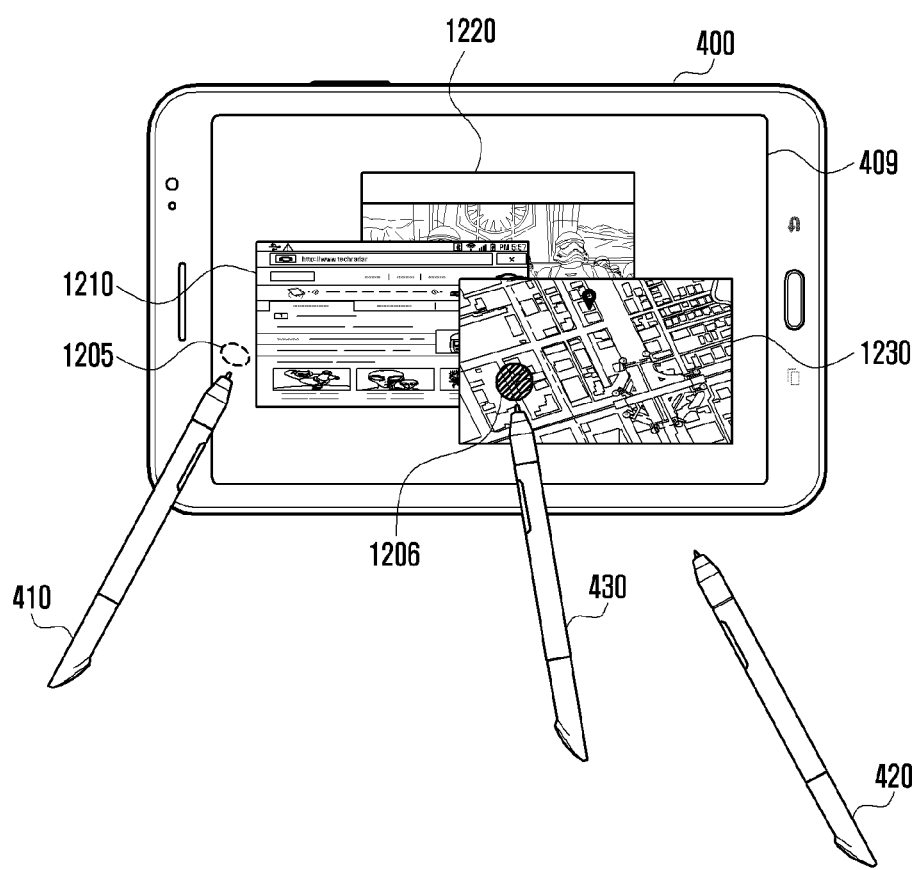

As shown in FIG. 12C, if a proximity input 1205 by the first external input device 410 is detected, if a touch input 1206 by the third external input device 430 is detected, and if the strength of the ID signal received from the second external input device 420 exceeds the first threshold value, the electronic device 400 may determine that the priorities of the IDs of the first, second, and third external input devices 410, 420, and 430 are the second, third, and first priorities, respectively. Then, the electronic device 400 may arrange the screens 1210, 1220, and 1230 associated with applications corresponding to the IDs of the first, second, and third external input devices 410, 420, and 430, respectively, according to the priorities and then display the screens on the display 409.

Figure 12D:
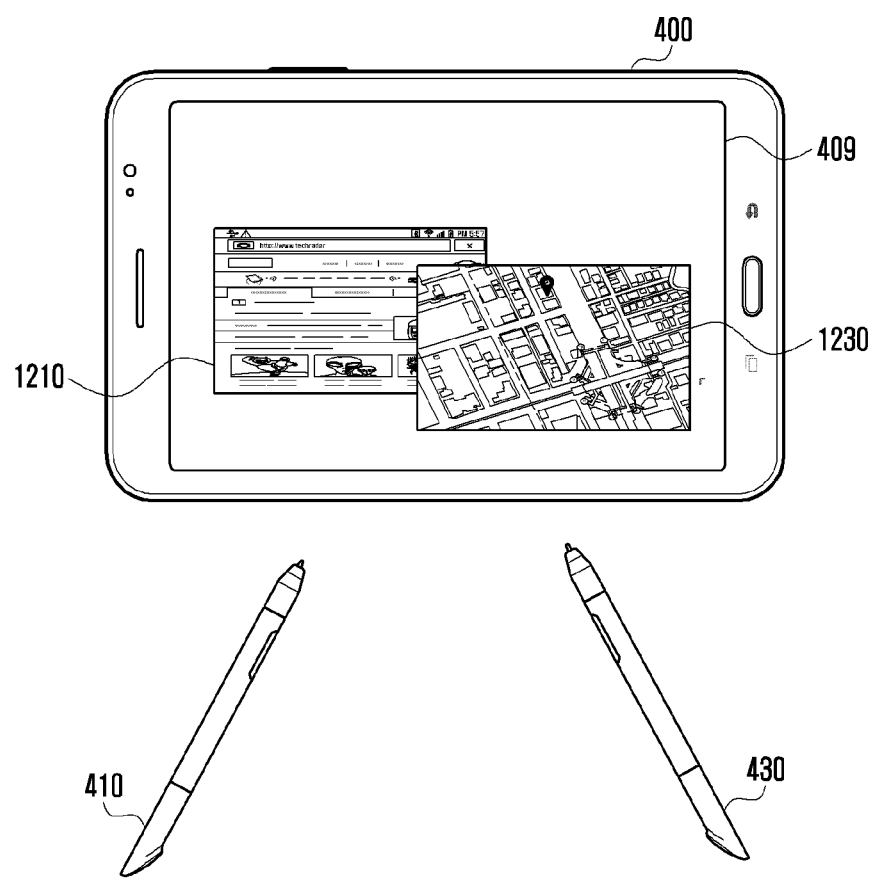

As shown in FIG. 12D, if the strength of the ID signal received from each of the first and third external input devices 410 and 430 exceeds the first threshold value, and if the ID signal having the ID of the second external input device 420 is not received again, the electronic device 400 may determine that the priorities of the IDs of the first and third external input devices 410 and 430 are the second and first priorities, respectively, by considering a time point when the touch input by the first external input device 410 is detected in FIG. 12A, and by further considering a time point when the touch input by the third external input device 430 is detected in FIG. 12C. Then, the electronic device 400 may arrange the screens 1210 and 1230 associated with applications corresponding to the IDs of the first and third external input devices 410 and 430, respectively, according to the priorities and then display the screens on the display 409. At this time, the electronic device 400 may terminate the execution of the media player which is an application corresponding to the ID of the second external input device 420 from which the ID signal is not received again.

FIGS. 13A, 13B, 13C, and 13D illustrate diagrams for displaying a plurality of screens in divided areas of a display according to the priorities of external input devices in an electronic device according to various embodiments of the present disclosure.

Figure 13A:
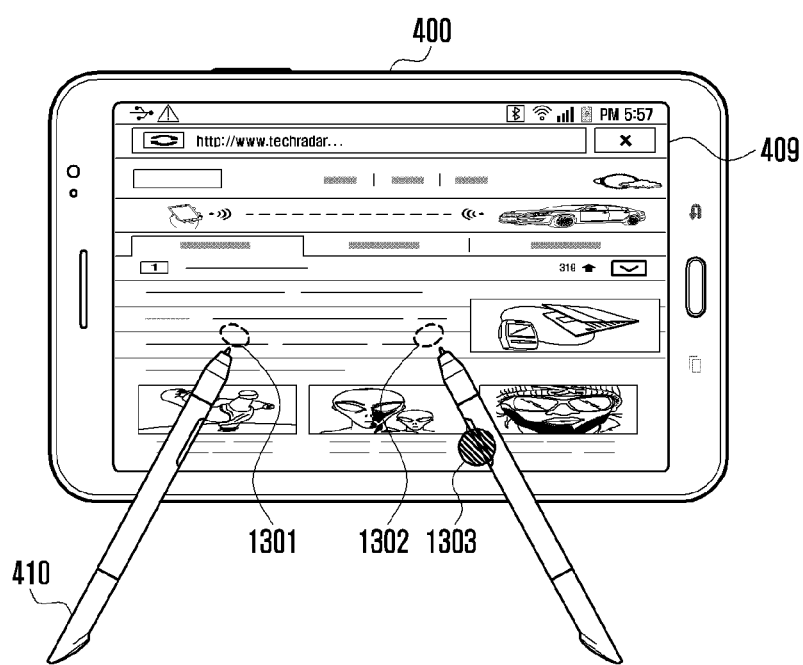
FIGS. 13A, 13B, 13C, and 13D illustrate diagrams for displaying a plurality of screens in divided areas of a display according to the priorities of external input devices in an electronic device according to various embodiments of the present disclosure.

As shown in FIG. 13A, when the priorities of the IDs of the first and second external input devices 410 and 420 are determined as the first and second priorities, respectively, and when a screen associated with an Internet browser (e.g., the browser 375) corresponding to the ID of the first external input device 410 is displayed on the display 409, the electronic device 400 may detect a proximity input 1301 by the first external input device 410 and a proximity input 1302 by the second external input device 420. In this case, if the user manipulates a physical button 1303 of the second external input device 420 having the second priority, the electronic device 400 may detect an additional variation of magnetic field caused by the second external input device 420.

Figure 13B:
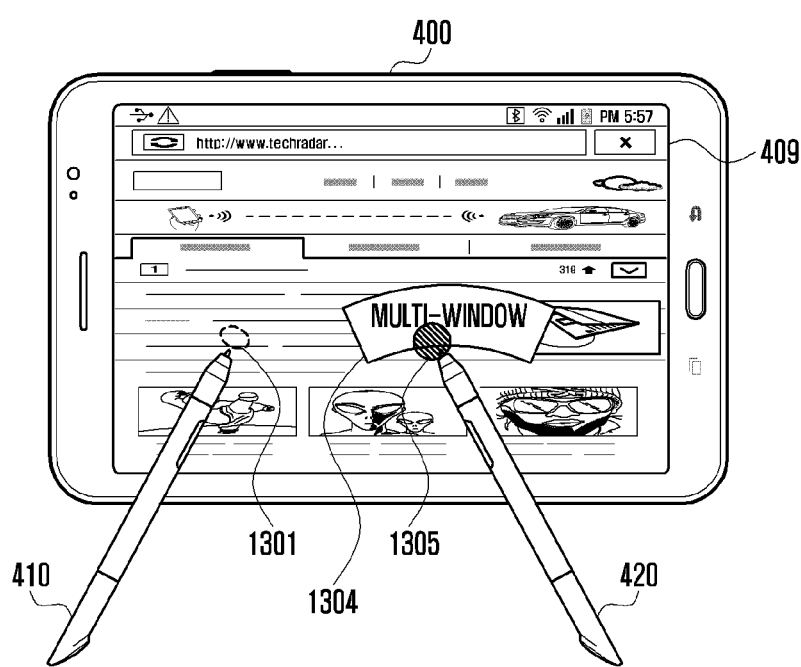

As shown in FIG. 13B, when the additional variation of magnetic field caused by the second external input device 420 is detected, the electronic device 400 may display, in a divided region of the display 409, a user interface 1304 that allows the user to select whether to display a screen associated with an application corresponding to the ID of the second external input device 420. At this time, the electronic device 400 may identify the coordinates where the additional variation of magnetic field caused by the second external input device 420 is detected, and then display the user interface 1304 at a position corresponding to the identified coordinates. Through a touch input 1305 by the second external input device 420, the user may select displaying the screen associated with the application corresponding to the ID of the second external input device 420 in the divided region of the display 409. Therefore, using an external input device having an ID priority other than the first priority, the user may control the function and operation of the electronic device 400.

On the other hand, when a screen associated with the Internet browser corresponding to the ID of the first external input device 410 having the first ID priority is displayed on the display 409, and when the proximity input 1302 is continuously detected for a given time without any additional variation of magnetic field caused by the second external input device 410 having the second ID priority, the electronic device 400 may determine to display, in the divided region of the display 409, a screen associated with an application corresponding to the ID of the second external input device 420. In this case, the electronic device 400 may identify the coordinates where the proximity input 1301 by the first external input device 410 is detected and the coordinates where the proximity input 1302 by the second external input device 420 is detected. Then, based on the identified coordinates, the electronic device 400 may determine a screen position of the divided region of the display 409.

Figure 13C:
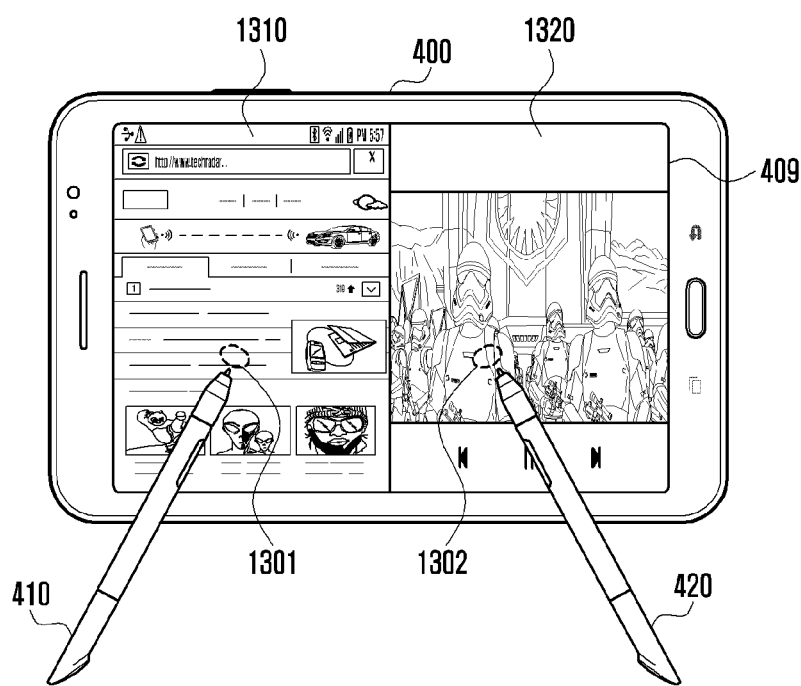

As shown in FIG. 13C, when it is determined to display a screen associated with the application corresponding to the ID of the second external input device 420 in the divided region of the display 409, the electronic device 400 may display, in the divided regions of the display 409, a screen 1310 of the Internet browser corresponding to the ID of the first external input device 410 and a screen 1320 of the media player corresponding to the ID of the second external input device 420, respectively. In this case, the electronic device 400 may determine the priority of the ID of each of the first and second external input devices 410 and 420 equally as the first priority. In addition, the electronic device 400 may display the screen 1310 associated with the Internet browser in one divided region of the display 409 while the proximity input 1301 by the first external input device 410 is detected, and may also display the screen 1320 associated with the media player in the other divided region of the display 409 while the proximity input 1302 by the second external input device 420 is detected. Further, in FIG. 13B, the electronic device 400 may identify the coordinates where the touch input by the second external input device 420 is detected, and then, based on the identified coordinates, determine the divided regions of the display 409 in which the screens 1310 and 1320 are displayed, respectively.

Figure 13D:
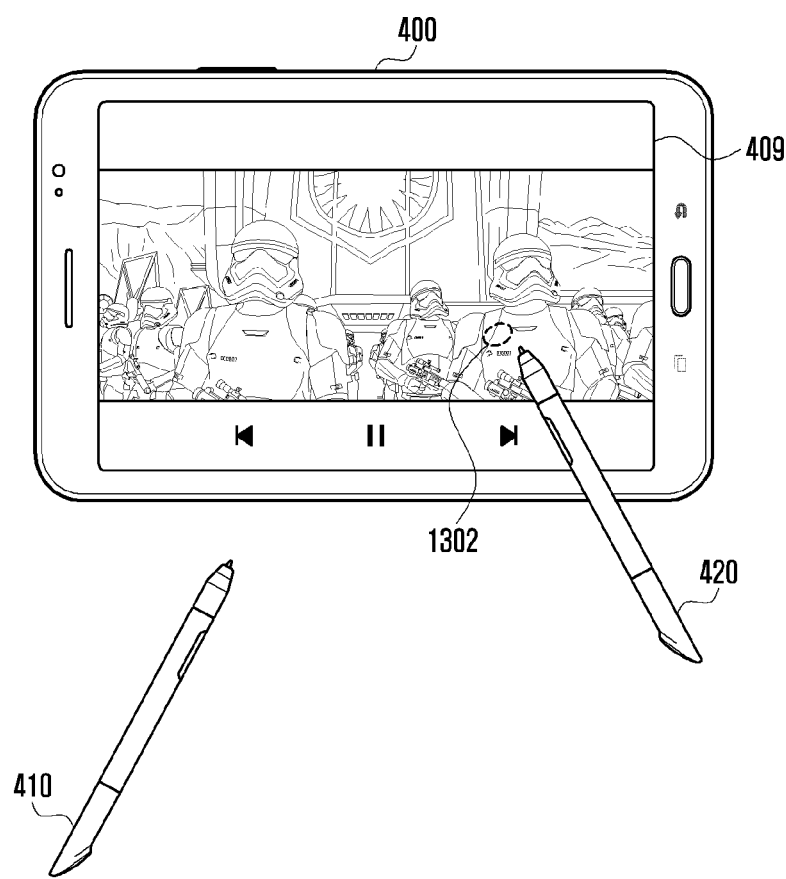

As shown in FIG. 13D, if the proximity input of the first external input device 410 is not detected, and if only the proximity input 1302 of the second external input device 420 is detected, the electronic device 400 may determine that the priorities of the IDs of the first and second external input devices 410 and 420 are the second and first priorities, respectively. In this case, the electronic device 400 may display a screen associated with the media player on the entire region of the display 409.

Figure 14A:
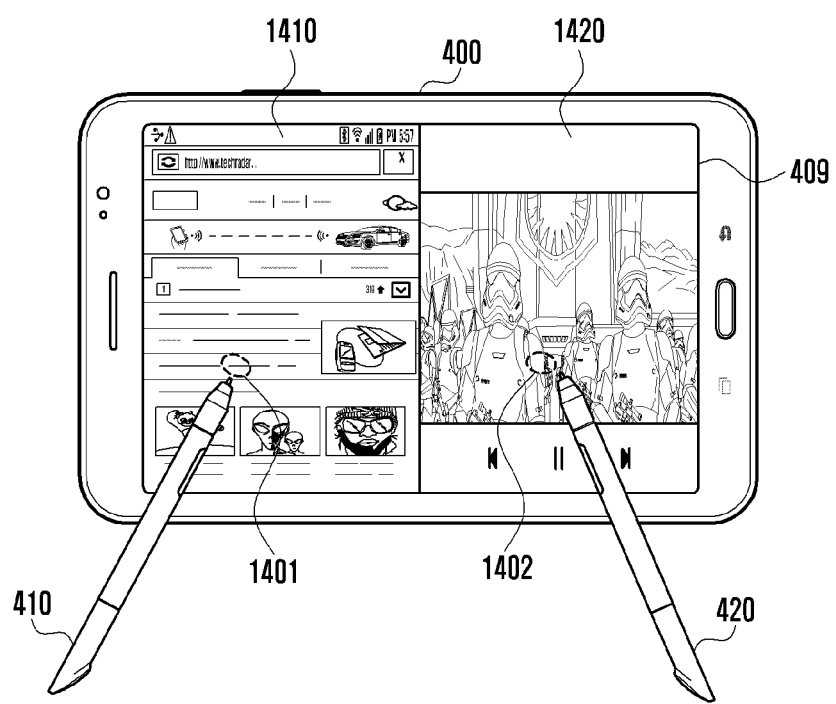
FIGS. 14A and 14B illustrate diagrams for displaying a plurality of screens in divided areas of a display in an electronic device according to various embodiments of the present disclosure.
Figure 14B:
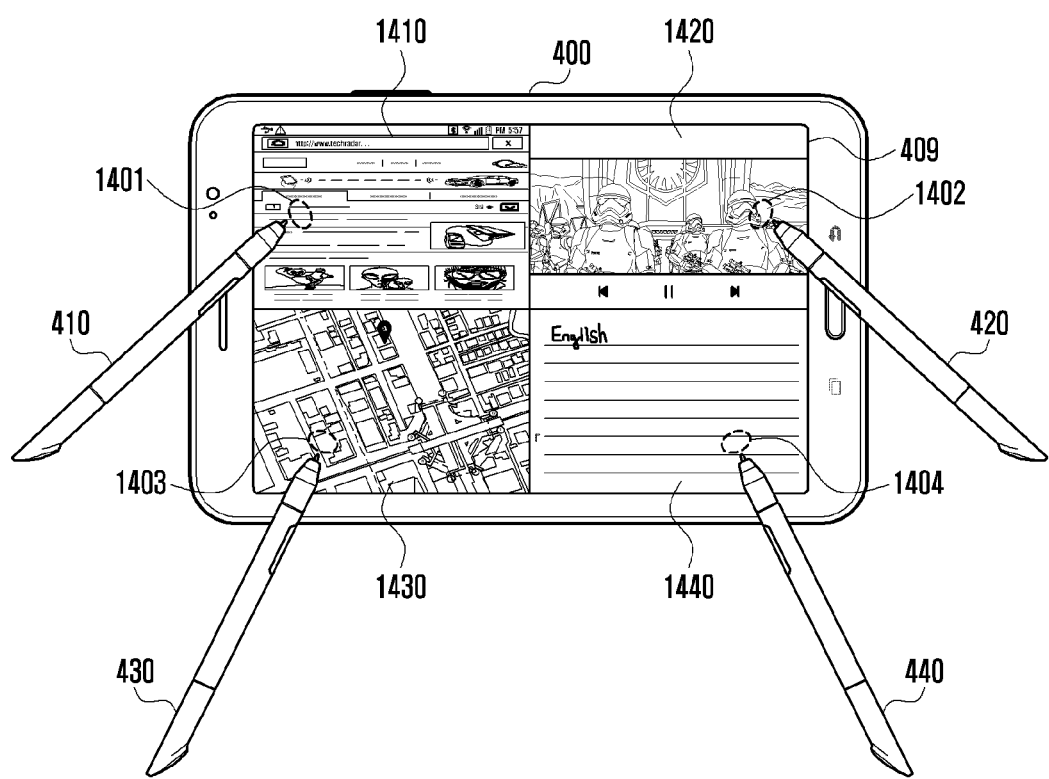

FIGS. 14A and 14B illustrate diagrams for displaying a plurality of screens in divided areas of a display in an electronic device according to various embodiments of the present disclosure.

As shown in FIG. 14A, by considering the number of external input devices and the coordinates where a proximity input is detected, the electronic device 400 may divide a display region of the display 409 in which a screen is outputted. For example, if the proximity input is detected from two external input devices 410 and 420, the electronic device 400 may divide the display region of the display 409 into two regions. Then, the electronic device 400 may display a screen 1410 of an Internet browser (e.g., the browser 375) corresponding to the ID of the first external input device 410 and a screen 1420 of a media player (e.g., the media player 382) corresponding to the ID of the second external input device 420 in the two divided regions, respectively. On the other hand, the electronic device 400 may divide the display region of the display 409, based on any other predetermined criteria (e.g., size, etc.).

As shown in FIG. 14B, if the proximity input is detected from four external input devices 410, 420, 430, and 440, the electronic device 400 may divide the display region of the display 409 into four regions. Then, the electronic device 400 may displays, in the four divided regions, respectively, the screen 1410 of the Internet browser corresponding to the ID of the first external input device 410, the screen 1420 of the media player corresponding to the ID of the second external input device 420, a screen 1430 of a map application corresponding to the ID of the third external input device 430, and a screen 1440 of a memo application corresponding to the ID of the fourth external input device 440.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
   a housing;
   a display exposed through a portion of the housing;
   a first communication circuit disposed inside the housing;
   a detection circuit disposed inside the housing, wherein the detection circuit is configured to detect a stylus pen when the stylus pen including a second communication circuit is located within a predetermined distance range from the display;
   a memory disposed inside the housing; and
   a processor disposed inside the housing and operably connected to the display, the first communication circuit, the detection circuit, and the memory, and wherein the processor is configured to:
      receive a signal containing unique identification information from each of a plurality of stylus pens through the first communication circuit,
      determine priorities of the plurality of stylus pens, based on a strength of the signal received from each of the plurality of stylus pens and based on an input generated based on a touch by at least one of the plurality of stylus pens on the display or generated based on a movement of at least one of the plurality of stylus pens within the predetermined distance range, execute a first application program based on the determined priorities of the plurality of the stylus pens while receiving the input generated based on the touch by the at least one of the plurality of stylus pens on the display or generated based on the movement of the at least one of the plurality of stylus pens detected within the predetermined distance range, and associate the unique identification information with the first application program.

2. The electronic device of claim 1, wherein the processor is further configured to:

detect, through the detection circuit, that the stylus pen is out of the predetermined distance range, and terminate an execution of the first application program.

3. The electronic device of claim 2, wherein the processor is further configured to:

detect, through the detection circuit, that the stylus pen is located within the predetermined distance range after the execution of the first application program is terminated, and execute the first application program again.

4. The electronic device of claim 1, wherein the processor is further configured to detect coordinates where the stylus pen is located on the display, based on a strength of the received signal and the received input.

5. The electronic device of claim 1, wherein the processor is further configured to:

check whether the input generated based on the touch by the stylus pen is received for a given time, when information related to the unique identification information is not stored in the memory, associate the unique identification information with the first application program when then input generated based on the touch by the stylus pen is received for the given time, and store information about association between the unique identification information and the first application program in the memory as information associated with the unique identification information.

6. The electronic device of claim 1, wherein the processor is further configured to terminate an execution of the first application program when a strength of the received signal does not exceed a threshold value for a given time.

7. The electronic device of claim 1, wherein the processor is further configured to separately display two or more screens associated with two or more application programs, respectively, on the display, based on the determined priorities.

8. The electronic device of claim 7, wherein when two or more stylus pens have a first priority, the processor is further configured to separately display two or more screens associated with two or more application programs corresponding to the two or more stylus pens including the first priority, respectively, on the display.

9. The electronic device of claim 8, wherein the processor is further configured to:

separately display the two or more screens associated with the two or more application programs corresponding to the two or more stylus pens including the first priority, respectively, on the display, based on coordinates where the two or more stylus pens including the first priority are located on the display.

10. A method for processing an input by an external input device at an electronic device, the method comprising:

receiving, through a first communication circuit of the electronic device, a signal containing unique identification information from each of a plurality of stylus pens;

determining, through a processor of the electronic device, priorities of the plurality of stylus pens, based on a strength of the signal received from each of the plurality of stylus pens and based on an input generated based on a touch by at least one of the plurality of stylus pens on a display or generated based on a movement of at least one of the plurality of stylus pens within a predetermined distance range;

executing, through the processor, a first application program based on the determined priorities of the plurality of stylus pens while receiving the input generated based on the touch by the at least one of the plurality of stylus pens on a display of the electronic device or generated based on the movement of the at least one of the plurality of stylus pens detected within the predetermined distance range; and associating, through the processor, the unique identification information with the first application program.

11. The method of claim 10, further comprising:

detecting, through the processor, that the at least one of the plurality of stylus pens is out of the predetermined distance range; and terminating, through the processor, an execution of the first application program.

12. The method of claim 11, further comprising:

detecting, through the processor, that the at least one of the plurality of stylus pens is located within the predetermined distance range after the execution of the first application program is terminated; and executing again, through the processor, the first application program.

13. The method of claim 10, further comprising, detecting, through the processor, coordinates where the at least one of the plurality of stylus pens is located on the display, based on a strength of the received signal and the received input.

14. The method of claim 10, further comprising:

checking, through the processor, whether the input generated based on the touch by the at least one of the plurality of stylus pens is received for a given time, when information related to the unique identification information is not stored in a memory of the electronic device;

associating, through the processor, the unique identification information with the first application program when then input generated based on the touch by the at least one of the plurality of stylus pens is received for the given time; and storing, through the processor, information about association between the unique identification information and the first application program in the memory as information associated with the unique identification information.

15. The method of claim 10, further comprising, terminating, through the processor, an execution of the first application program when a strength of the received signal does not exceed a threshold value for a given time.

16. The method of claim 10, further comprising, separately displaying, through the processor, two or more screens associated with two or more application programs, respectively, on the display, based on the determined priorities.

17. The method of claim 16, further comprising, when two or more stylus pens have a first priority, separately displaying, through the processor, two or more screens associated with two or more application programs corresponding to the two or more stylus pens including the first priority, respectively, on the display.

18. The method of claim 17, further comprising, separately displaying, through the processor, the two or more screens associated with the two or more application programs corresponding to the two or more stylus pens including the first priority, respectively, on the display, based on coordinates where the two or more stylus pens including the first priority are located on the display.

* * * * *